(12) United States Patent
Takaoki

(10) Patent No.: US 7,202,316 B2
(45) Date of Patent: *Apr. 10, 2007

(54) MODIFIED PARTICLE, CATALYST COMPONENT FOR ADDITION POLYMERIZATION, CATALYST FOR ADDITION POLYMERIZATION AND PROCESS FOR PRODUCING ADDITION POLYMER

(75) Inventor: Kazuo Takaoki, Albany, CA (US)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/665,574

(22) Filed: Sep. 22, 2003

(65) Prior Publication Data

US 2005/0192178 A1 Sep. 1, 2005

(30) Foreign Application Priority Data

Sep. 24, 2002 (JP) ............................. 2002-277059

(51) Int. Cl.
*C08F 4/20* (2006.01)
*C08F 4/58* (2006.01)
*C08F 4/52* (2006.01)
*B01J 31/26* (2006.01)

(52) U.S. Cl. .................. 526/166; 526/121; 526/149; 526/142; 526/151; 526/138; 502/129; 502/118

(58) Field of Classification Search ................ 502/129, 502/104, 118, 155, 117, 103, 113; 526/148, 526/149, 151, 142, 146, 160, 270, 943, 348, 526/170, 121, 166, 138
See application file for complete search history.

(56) References Cited

U.S. PATENT DOCUMENTS 5,600,055 A * 2/1997 Chung et al. ............... 585/727

| | | | | |
|---|---|---|---|---|
| 6,586,356 B2 | 7/2003 | Takaoki et al. | ............. | 502/155 |
| 2002/0032289 A1* | 3/2002 | Wang et al. | ................ | 526/171 |
| 2002/0143124 A1 | 10/2002 | Ogane | ......... | 526/160 |
| 2003/0069127 A1 | 4/2003 | Takaoki et al. | ............. | 502/108 |

FOREIGN PATENT DOCUMENTS

| DE | 10164188 A1 | 8/2002 |
|---|---|---|
| EP | 0949273 A1 | 10/1999 |
| EP | 1113026 A2 | 7/2001 |
| EP | 1114832 A1 | 7/2001 |
| EP | 1275662 A1 | 1/2003 |

OTHER PUBLICATIONS

Jones et al., Inorg. Chem., vol. 32, pp. 5136-5144, (1993).
Whitmire et al., Inorg. Chem., vol. 39, pp. 85-97, (2000).

* cited by examiner

*Primary Examiner*—Ling-Sui Choi
*Assistant Examiner*—Rip A. Lee
(74) *Attorney, Agent, or Firm*—Birch, Stewart, Kolasch & Birch, LLP

(57) ABSTRACT

A modified particle obtained by a process containing contacting a Bi compound, a compound having an electron-withdrawing group and an active hydrogen and particle; and a catalyst component for addition polymerization containing the modified particle; a catalyst for addition polymerization prepared by a process containing contacting the modified particle (A) and a transition metal compound of Groups 3 to 11 or lantanide series (B); and a catalyst for addition polymerization prepared by a process containing contacting the modified particle (A) and a transition metal compound of Groups 3 to 11 or lantanide series (B) and an orbanoaluminum compound (C); and a process for producing an addition polymer with the catalyst.

11 Claims, No Drawings

MODIFIED PARTICLE, CATALYST COMPONENT FOR ADDITION POLYMERIZATION, CATALYST FOR ADDITION POLYMERIZATION AND PROCESS FOR PRODUCING ADDITION POLYMER

This nonprovisional application claims priority under 35 U.S.C. § 119(a) on Patent Application No. 2002-277059 filed in Japan on Sep. 24, 2002, which is herein incorporated by reference.

BACKGROUND OF THE INVENTION

1. Technical Field

The present invention relates to a modified particle used for a catalyst component for addition polymerization; a catalyst component for addition polymerization; a catalyst for addition polymerization obtained using the same; and a process for producing an addition polymer.

2. Description of Related Arts

Olefin polymers such as polypropylene and polyethylene are superior in mechanical properties and chemical resistance and additionally superior in balance between properties and economies, and thereby they are extensively used in various molding fields.

These olefin polymers have hitherto been produced by polymerizing an olefin mainly using a conventional solid catalyst (multi-site catalyst) formed from a combination of the 4 group metal compound such as titanium trichloride or titanium tetrachloride and the 13 group metal compound typified by an organoaluminum compound.

In recent years, there has been proposed a process for producing an addition polymer comprising the step of polymerizing an olefin and the like using a so-called single site catalyst, which is a combination of a transition metal compound (for example, a metallocene complex and a non-metallocene complex) different from the solid catalyst component so far used, and an aluminoxane and the like. For example, a process comprising the step of using a combination of bis(cyclopentadienyl)zirconium dichloride and methylaluminoxane is reported in JP-A 58-19309. In addition, a combination of such a transition metal compound and a specific boron compound is also reported. For example, a process comprising the step of using bis(cyclopentadienyl)zirconium dimethyl and tri(n-butyl)ammonium tetraxis(pentafluorophenyl)borate is reported in JP-W1-502036. As known, an addition polymer obtained using such a single site catalyst is generally narrower in its molecular weight distribution than that obtained using the conventional solid catalyst (multi-site catalyst), and in the case of a copolymer, an addition polymer more homogeneous than that obtained using the conventional solid catalyst can be obtained because the comonomers are more homogeneously copolymerized.

An improvement of such catalysts for addition polymerization has been studied intensively, and, the kinds of metals used as a main catalyst component are broadly reported regarding each of Groups of the Periodic Table. For example, in Angew. Chem. Int. Ed. 38, 428 (1999), it is reported that metallocene complexes and non-metallocene compounds of metals of the Groups 3 to 13 are effective as a main catalyst component. On the other hand, as a co-catalyst component for activation used in combination of the metallocene complex or non-metallocene compound, aluminixanes and boron compounds belonging to the Group 13 occupy the center of its development. As a boron compound, a compound having an electron-withdrawing group on the boron atom, is generally effective.

SUMMARY OF THE INVENTION

An object of the present invention is to provide a modified particle which can form a catalyst for addition polymerization exhibiting a high polymerization activity by using as a co-catalyst component for activation (catalyst component); a catalyst component for addition polymerization composed of the modified particle; a catalyst for addition polymerization prepared by using the catalyst component; and a process for producing an addition polymer efficiently using the catalyst for addition polymerization.

Namely, the present invention relates to a modified particle (A) obtained by contacting the following (a), (b) and (c); a catalyst component for addition polymerization containing the modified particle; a catalyst for addition polymerization prepared by contacting the modified particle (A) and a transition metal compound of Groups 3 to 11 or lantanide series (B); and a catalyst for addition polymerization prepared by contacting the modified particle (A), a transition metal compound of Groups 3 to 11 or lantanide series (B) and an organoaluminum compound (C); and further to a process for producing an addition polymer using these catalysts:

(a) a compound represented by the following formula [1], $$BiL^1_m \qquad [1],$$

(b) a compound represented by the following formula [2], $$R^1_{t-n}TH_n \qquad [2], \text{ and}$$

(c) particle, wherein m is a numeral corresponding to a valence of Bi; $L^1$ is a hydrogen atom, a halogen atom, a hydrocarbon group or a hydrocarbon oxy group, when more than one $L^1$ exist, they may be the same or different from one another; $R^1$ is an electron-withdrawing group or an electron-withdrawing group-containing group, when more than one $R^1$ exists, they may be the same or different from one another; T represents a non-metal atom of Group 15 or 16 of the periodic table; t is a numeral corresponding to a valence of T; n is an integer of 1 to t excluding 2.

Further, the present invention relates to a catalyst component for addition polymerization composed of the modified particle (A).

Still further, the present invention relates to a catalyst for addition polymerization obtained by contacting the modifies particle (A) with a transition metal compound (B) of Group 3–11 or lanthanide series, and optionally an organoaluminum compound (C).

Furthermore, the present invention relates to a process for producing an addition polymer which comprises polymerizing an addition-polymerizable monomer with the catalyst for addition polymerization described above.

The present invention will be explained in more detail below.

DETAILED DESCRIPTION OF THE INVENTION

In the above formula [1], m represents a valence of Bi, and is 3 or 5, preferably 3.

$L^1$ in the above formula [1] represents a hydrogen atom, a halogen atom, a hydrocarbon group or a hydrocarbon oxy group, and when more than one $L^1$ exists, they may be the same or different from one another. Specific examples of the halogen atom as $L^1$ include a fluorine atom, a chlorine atom, a bromine atom and an iodine atom. As a hydrocarbon group as $L^1$, an alkyl group, an aryl group or an aralkyl group is preferred. As a hydrocarbon oxy group as $L^1$, an alkoxy group or an aryloxy group is preferred.

The alkyl group is preferably an alkyl group having 1 to 20 carbon atoms. Examples thereof include a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl, a n-octyl group, a n-decyl group, a n-dodecyl group, a n-pentadecyl group and a n-eicosyl group. More preferred is a methyl group, an ethyl group, an isopropyl group, a tert-butyl group and an isobutyl group.

These alkyl groups may be substituted with a halogen atom such as a fluorine atom, a chlorine atom, a bromine atom or an iodine atom. Examples of the alkyl group having 1 to 20 carbon atoms substituted with the halogen atom include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group and a perbromoeicosyl group, a 1H,1H-perfluoropropyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group, a 1H,1H-perfluoroeicosyl group, a 1H,1H-perchloropropyl group, a 1H,1H-perchlorobutyl group, a 1H,1H-perchloropentyl group, a 1H,1H-perchlorohexyl group, a 1H,1H-perchlorooctyl group, a 1H,1H-perchlorododecyl group, a 1H,1H-perchloropentadecyl group, a 1H,1H-perchloroeicosyl group, a 1H,1H-perbromopropyl group, a 1H,1H-perbromobutyl group, a 1H,1H-perbromopentyl group, a 1H,1H-perbromohexyl group, a 1H,1H-perbromooctyl group, a 1H,1H-perbromododecyl group, a 1H,1H-perbromopentadecyl group and a 1H,1H-perbromoeicosyl group.

Further, these alkyl groups may be partially substituted with an alkoxy group such as a methoxy group or an ethoxy group, an aryloxy group such as a phenoxy group, or an aralkyloxy group such as a benzyloxy group.

The aryl group is preferably an aryl group having 6 to 20 carbon atoms. Examples thereof include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group, and more preferred is a phenyl group.

These aryl groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group.

The aralkyl group is preferably an aralkyl group having 7 to 20 carbon atoms. Examples thereof include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, an (isobutylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a naphthylmethyl group and an anthracenylmethyl group, and more preferred is a benzyl group.

These aralkyl groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group.

The alkoxy group is preferably an alkoxy group having 1 to 20 carbon atoms. Examples thereof include a methoxy group, an ethoxy group, a n-propoxy group, an isopropoxy group, a n-butoxy group, a sec-butoxy group, a tert-butoxy group, an isobutoxy group, a n-pentyloxy group, a neopentyloxy group, a n-hexyloxy group, a n-octyloxy group, a n-decyloxy group, a n-dodecyloxy group, a n-pentadecyloxy group, a n-eicosyl oxy group, and the like. A methoxy group, an ethoxy group, an isopropoxy group, a tert-butoxy group or an isobutoxy group is more preferable.

These alkoxy groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group.

The aryloxy group is preferably an aryloxy group having 6 to 20 carbon atoms, and specific examples therof include for example, a phenoxy group, a 2-tolyloxy group, a 3-tolyloxy group, a 4-tolyloxy group, a 2,3-xylyloxy group, a 2,4-xylylphenoxy group, a 2,5xylyloxy group, a 2,6xylyloxy group, a 3,4-xylyloxy group, a 3,5xylyloxy group, a 2,3,4-trimethylphenoxy group, a 2,3,5-trimethylphenoxy group, a 2,3,6-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, an isobutylphenoxy, n-pentylphenoxy, a neopentylphenoxy, n-hexylphenoxy group, a n-octylphenoxy group, a n-decylphenoxy group, a n-tetradecylphenoxy group, a naphthoxy group, an anthrathenoxy group and the like. More preferred is a phenoxy group.

These alkoxy groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group.

As $L^l$ in the above formula [1], preferred is a halogen atom, an alkyl group, an aryl group, alkoxy group or an aryloxy group, more preferred is a hydrogen atom, aryl group, alkoxy group or aryloxy group, and particularly preferable is an aryl group.

The compound (b) is a compound represented in the formula [2].

$$R^1_{t-n}TH_n \quad [2]$$

T in the above formula [2] is a non-metal atom of Group 15 or Group 16 of the periodic table of elements (Revised edition of IUPAC Inorganic Chemistry Nomenclature 1989). Specific examples of the non-metal atom of the Group 15 include a nitrogen atom and a phosphorous atom, and specific examples of the non-metal atom of the Group 16 are an oxygen atom and a sulfur atom. As T, a nitrogen atom or a oxygen atom is preferred. As T, particularly preferred is an oxygen atom.

"t" in the above-mentioned formula [2] is a numeral corresponding to a valence of T. For example, when T is a non-metal atom of the Group 15, t is 3, and when T is a non-metal atom of the Group 16, t is 2.

"n" is an integer satisfying $1 \leq n \leq t$ but excludes 2 because when "n" is 2, it is difficult to obtain the effect of the present invention. "n" is preferably 1.

$R^1$ in the above-mentioned formula [2] is an electron-withdrawing group or an electron-withdrawing group-containing group, and when more than one $R^1$ exist, they may be the same or different from one another. As an index of the electron-withdrawing property, there is known a substituent constant σ of the Hammet's rule. As the electron-withdrawing group, there is a functional group whose substituent constant σ of the Hammet's rule is positive.

Specific examples of the electron-withdrawing group include a fluorine atom, a chlorine atom, a bromine atom, an iodine atom, a cyano group, a nitro group, a carbonyl group, a sulfone group and a phenyl group. Examples of the electron-withdrawing group-containing group include a halogenated alkyl group, a halogenated aryl group, a (halogenatedalkyl)aryl group, acyanatedaryl group, a nitrated aryl group and an ester group (for example, alkoxycarbonyl group, aralkyloxycarbonyl group and aryloxycarbonyl group), an acyl group, a halogenated acyl group and the like.

Specific examples of the halogenated alkyl group include a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, a 1,1-bis(triiodomethyl)-2,2,2-triiodoethyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group, a 1H,1H-perfluoroeicosyl group, a 1H,1H-perchlorobutyl group, a 1H,1H-perchloropentyl group, a 1H,1H-perchlorohexyl group, a 1H,1H-perchlorooctyl group, a 1H,1H-perchlorododecyl group, a 1H,1H-perchloropentadecyl group, a 1H,1H-perchloroeicosyl group, a 1H,1H-perbromobutyl group, a 1H,1H-perbromopentyl group, a 1H,1H-perbromohexyl group, a 1H,1H-perbromooctyl group, a 1H,1H-perbromododecyl group, a 1H,1H-perbromopentadecyl group and a 1H,1H-perbromoeicosyl group.

Specific examples of the halogenated aryl group are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 2,3,5,6-tetrachlorophenyl group, a pentachlorophenyl group, a 2,3,5,6-tetrachloro-4-trichloromethylphenyl group, a 2,3,5,6-tetrachloro-4-pentachlorophenylphenyl group, a perchloro-1-naphthyl group, a perchloro-2-naphthyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 2,3,5,6-tetrabromophenyl group, a pentabromophenyl group, a 2,3,5,6-tetrabromo-4-tribromomethylphenyl group, a 2,3,5,6-tetrabromo-4-pentabromophenylphenyl group, a perbromo-1-naphthyl group, a perbromo-2-naphthyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 2,3,5,6-tetraiodophenyl group, a pentaiodophenyl group, a 2,3,5,6-tetraiodo-4-triiodomethylphenyl group, a 2,3,5,6-tetraiodo-4-pentaiodophenylphenyl group, a periodo-1-naphthyl group and a periodo-2-naphthyl group.

Specific examples of the (halogenated alkyl)aryl group include a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group and a 2,4,6-tris(trifluoromethyl)phenyl group.

Specific examples of the cyanated aryl group include a 2-cyanophenyl group, a 3-cyanophenyl group and a 4-cyanophenyl group.

Specific examples of the nitrated aryl group include a 2-nitrophenyl group, a 3-nitrophenyl group and a 4-nitrophenyl group.

Specific examples of the ester group include a methoxycarbonyl group, an ethoxycarbonyl group, a n-propoxycarbonyl group, an isopropoxycarbonyl group, a phenoxycarbonyl group, a trifluoromethoxycarbonyl group and a pentafluorophenoxycarbonyl group.

Specific examples of the acyl group include a formyl group, an ethanoyl group, a n-propopanoyl group, a butanoyl group, a trifluoroethanoyl group, a benzoyl group, a pentafluorobenzoyl group, a perfluoroethanoyl group, a perfluoropropanoyl group, a perfluorobutanoyl group, a perfluoropentanoyl group, a perfluorohexanoyl group, a perfluoroheptanoyl group, a perfluorooctanoyl group, a perfluorononanoyl group, a perfluorodecanoyl group, a perfluoroundecanoyl group and a perfluorododecanoyl group.

$R^1$ is preferably a halogenated hydrocarbon group, more preferably halogenated alkyl group and a halogenated aryl group. Further preferred is a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group or a pentachlorophenyl group. Particularly preferred is a fluoroalkyl group or a fluoroaryl group, and the most preferred is a trifluoromethyl group, 2,2,2-trifluore-1-trifluoromethyethyl group, 1,1-bis(trifluoromethyl)-2,2,2-trifluoroethyl group, 3,5-difluorophenyl group or 3,4,5-trifluorophenyl group, pentafluorophenyl group.

Specific examples of the compound (a) include halogenated bismuths such as bismuth(III)fluoride, bismuth(III) chloride, bismuth(III)bromide and bismuth(III)iodide; trialkyl bismuths such as trimethyl bismuth; triaryl bismuths such as triphenyl bismuth; trialkoxy bismuths such as trimethoxy bismuth and triethoxy bismuth; triaryl bisbuths such as triphenoxy bismuth; halogenated bismuths(V) such as bismuth(V)fluoride, bismuth(V)chloride, bismuth(V)bromide and bismuth(V)iodide; pentaalkyl bismuths such as pentamethyl bismuth; pentaalkoxy bismuths such as pentamethoxy bismuth and pentaethoxy bismuth; and pentaaryloxy bismuths such as pentaphenoxy bismuth.

The compound (a) preferably include halogenated bismuths(III), trialkyl bismuths, triaryl bismuths, trialkoxy bismuths, triaryloxy bismuths, more preferred is halogenated bismuths(III), triaryl bismuths, trialkoxy bismuths or triaryloxy bismuths, and particularly preferred are triaryl bismuths such as triphenyl bismuth.

Specific examples of the compounds (b) include amines such as di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis (2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis(3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, bis(3-cyanophenyl)amine, bis(4-cyanophenyl)amine, bis(2-nitrophenyl)amine, bis(3-nitrophenyl)amine, bis(4-nitrophenyl)amine, bis(1H, 1H-perfluorobutyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicocyl)amine, bis(1H, 1H-perchlorobutyl)amine, bis(1H,1H-perchlorobutyl)amine, bis(1H,1H-perchloropentyl)amine, bis(1H,1H-perchlorohexyl)amine, bis(1H,1H-perchlorooctyl)amine, bis(1H,1H-perchlorododecyl)amine, bis(1H,1H-perchloropentadecyl)amine, bis(1H,1H-perchloroeicocyl)amine, bis(1H, 1H-perbromobutyl)amine, bis(1H,1H-perbromobutyl)amine, bis(1H,1H-perbromopentyl)amine, bis(1H,1H-perbromohexyl)amine, bis(1H,1H-perbromooctyl)amine, bis(1H,1H-perbromododecyl)amine, bis(1H,1H-perbromopentadecyl)amine, bis(1H,1H-perbromoeicocyl)amine. Further, phosphine compounds in which a nitrogen atom is substituted by a phosphorous atom can be also exemplified similarly. Those phosphine compounds in which a nitrogen atom is replaced with a phosphorus atom in the above-mentioned amine compounds, and the like are also exemplified compounds which are represented by replacing amine in the above-mentioned specific examples by phosphine, etc.

Alcohols include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3- pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol, 1,1-bis(triiodomethyl)-2,2,2-triiodoethanol, 1H,1H-perfluorobutanol, 1H,1H-perfluoropentanol, 1H,1H-perfluorohexanol, 1H,1H-perfluorooctanol, 1H,1H-perfluorododecanol, 1H,1H-perfluoropentadecanol, 1H,1H-perfluoroeicosanol, 1H,1H-perchlorobutanol, 1H,1H-perchloropentanol, 1H,1H-perchlorohexanol, 1H,1H-perchlorooctanol, 1H,1H-perchlorododecanol, 1H,1H-perchloropentadecanol, 1H,1H-perchloroeicosanol, 1H,1H-perbromobutanol, 1H,1H-perbromopentanol, 1H,1H-perbromohexanol, 1H,1H-perbromooctanol, 1H,1H-perbromododecanol, 1H,1H-perbromopentadecanol and 1H,1H-perbromoeicosanol. Further, thiol compounds in which an oxygen atom is replaced with substituted by a sulfur atom can be also exemplified similarly. Those thiol compounds are compounds which are represented by replacing methanol in the above-described specific example by methanethiol, ethanol by ethanethiol, propanolbypropanethiol, butanolbybutanethiol, pentanol by pentanethiol, hexanol by hexanethiol, octanol by octanethiol, dodecanol by dodecanethiol, pentadecanol by pentadecanethiol and eicosanol by eicosanethiol.

The phenols include 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphtol, perfluoro-2-naphtol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphtol, perchloro-2-naphtol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphtol, perbromo-2-naphtol, 2-iodophenol, 3-iodophenol, 4-Iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphtol, periodo-2-naphtol, 2-(trifluoromethyl)phenol, 3-(trifluoromethyl)phenol, 4-(trifluoromethyl)phenol, 2,6-bis(trifluoromethyl) phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, 4-nitrophenol and the like. Further, thiophenol compounds in which an oxygen atom is substituted by a sulfur atom in the above-mentioned phenol compounds can be also exemplified similarly. Those thiophenol compounds are compounds which are represented by replacing phenol in the above-mentioned specific examples by thiophenol (in a case of naphtols, compounds represented by replacing naphtols with naphtylthiols).

Carboxylic acids include pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid and the like.

Preferable compounds (b) are bis(trifluoromethyl)amine, bis(2,2,2-trifluoromethyl)amine, bis(2,2,3,3,3-pentafluoropropyl)amine, bis(2,2,2-trifluoro-1-trifluoromethylethyl) amine, bis(1,1-bis(trifluoromethyl)-2,2,2-trifluoroethyl) amine or bis(pentafluorophenyl)amine as amines; trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol as alcohols; and 2-fluorophenol, 3-fluorophenol, 4-fluorophenol, 2,6-difluorophenol, 3,5-difluorophenol, 3,4,5-trifluorophenol, 2,4,6-trifluorophenol, pentafluorophenol, 2-(trifluoromethyl)phenol, 3-(trifluoromethyl)phenol, 4-(trifluoromethyl) phenol, 2,6-bis(trifluoromethyl)phenol, 3,5-bis(trifluoromethyl)phenol or 2,4,6-tris(trifluoromethyl)phenol as phenols.

The compounds (b) are more preferably, bis(trifluoromethyl)amine, bis(pentafluorophenyl) amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol, and further preferably 3,5-difluorophenol, 3,4,5-trifluorophenol, pentafluorophenol or 1,1-bis(trifluoromethyl)-2,2,2-trifluoroethanol.

As the particle (c), that which is generally used as a carrier is preferably used. A porous substance having a uniform particle diameter is preferred and an inorganic substance or an organic polymer is preferably used. An inorganic substance is more preferably used.

From a viewpoint of particle size distribution of a polymer obtained, the particle (c) has a geometric standard deviation of preferably not more than 2.5, more preferably not more than 2.0, and much more preferably not more than 1.7, wherein the geometric standard deviation is based on a volume of a particle diameter of the particle (c).

Examples of the inorganic substance used as the particle (c) are inorganic oxides. It is also permitted to use clay and clay mineral. These inorganic substances may be used in a mixture.

Specific examples of the inorganic oxide include $SiO_2$, $Al_2O_3$, $MgO$, $ZrO_2$, $TiO_2$, $B_2O_3$, $CaO$, $ZnO$, $BaO$, $ThO_2$ and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Among these inorganic oxides, $SiO_2$ and/or $Al_2O_3$ are/is preferred, and $SiO_2$ is particularly preferred. Incidentally, the above inorganic oxide may contain a small amount of carbonates, sulfates, nitrates and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the clay or clay mineral are kaolin, bentonite, Kibushi clay, gaerome clay, allophane, hisingerite, pyrophylite, talc, a mica group, a montmorillinite group, vermiculite, a chlorite group, palygorskite, kaolinite, nacrite, dickite and halloycite. Among these, smectite, montmorillonite, hectorite, raponite and saponite are preferred, and montmorillonite and hectorite are more preferred.

Among these inorganic substances, inorganic oxides are suitably used.

It is preferable that these inorganic substances are dried to contain substantially no water, and those dried by heat-treatment are preferred. The heat-treatment of inorganic substances, whose water content cannot be visually confirmed, is usually carried out at a temperature of from 100 to 1500° C., preferably from 100 to 1000° C., and more preferably from 200 to 800° C. The heating time is not particularly limited, and preferably from 10 minutes to 50 hours, more preferably from 1 hour to 30 hours. Further, during heating, there can be applied a method of passing a dried inert gas (e.g. nitrogen or argon) at a fixed flow rate, or a method of evacuating. The method is not limited thereto.

Further, though hydroxy groups are formed and exist on the surface of the inorganic oxides, modified inorganic oxides obtained by substituting active hydrogen of hydroxy groups on the surface of the inorganic oxides with various substituents, may be used as the inorganic oxides. As a substituted group, a silyl group is preferred. As the modified inorganic oxides, specifically there are illustrated inorganic oxides obtained by contact-treating with a trialkylchlorosilane such as trimethylchrolosilane, t-butyldimethylchlorosilane, dichlorodimethylsilane or chlorobromodimethylsilane; a triarylchlorosilane such as triphenylchlorosilane; a dialkyldichlorosilane such as dimethydichlorosilane; a diaryldichlorosilane such as diphenyldichlorosilane; an alkyltrichlorosilane such as methyltrichlorosilane; an aryltrichlorosilane such as phenyltrichlorosilane; a trialkylalkoxysilane such as trimethylmethoxysilane; a triarylalkoxysilane such as triphenylmethoxysilane; a dialkyldialkoxysilane such as dimethyldimethoxysilane; a diaryldialkoxysilane such as diphenyldimethoxysilane; an alkyltrialkoxysilane such as methyltrimethoxysilane; an aryltrialkoxysilane such as phenyltrimethoxysilane; a tetraalkoxysilane such as tetramethoxysilane; an alkyl disilazane such as 1,1,1,3,3,3-hexamethldisilazane; or tetrachlorosilane.

A median particle diameter of the inorganic substance is preferably from 5 to 1000 μm, more preferably from 10 to 500 μm, and more preferably from 10 to 100 μm. A pore volume is preferably not less than 0.1 ml/g, and more preferably 0.3 to 10 ml/g. The specific surface area is preferably from 10 to 1000 m$^2$/g, and more preferably from 100 to 500 m$^2$/g.

The organic polymer usable as the particle (c) may be any organic polymer, and it is permitted to use a mixture of more than one organic polymer. As the organic polymer, a polymer having an active hydrogen-carrying functional group or a functional group of a non-proton-donating Lewis base is preferred.

The active hydrogen-carrying functional group is not particularly limited as far as it has active hydrogen. Examples thereof are a primary amino group, a secondary amino group, an imino group, an amide group, a hydrazide group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group and a carbazolyl group. Among them, preferred is a primary amino group, a secondary amino group, an imino group, an amide group, an imide group, a hydroxy group, a formyl group, a carboxyl group, a sulfonic acid group or a thiol group. Particularly preferred is a primary amino group, a secondary amino group, an amide group or a hydroxy group. These groups may be substituted with a halogen atom or a hydrocarbon group having 1 to 20 carbon atoms.

The functional group of a non-proton-donating Lewis base is not particularly limited as far as it is a functional group having a Lewis base portion containing no active hydrogen atom. Specific examples thereof are a pyridyl group, an N-substituted imidazolyl group, an N-substituted indazolyl group, a nitrile group, an azido group, an N-substituted imino group, an N,N-substituted amino group, an N,N-substituted aminoxy group, an N,N,N-substituted hydrazino group, a nitroso group, a nitro group, a nitroxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group and a substituted sulfonic acid group. Preferred is a heterocyclic group, and more preferred is an aromatic heterocyclic group having an oxygen atom and/or a nitrogen atom in the ring. Particularly preferred are a pyridyl group, an N-substituted imidazolyl group and an N-substituted indazoyl group, and the most preferred is a pyridyl group. These groups may be substituted with a halogen atom or a hydrocarbon group having 1 to 20 carbon atoms.

An amount of the active hydrogen-carrying functional group or the functional group of a non-proton-donating Lewis base is not particularly limited. It is preferably from 0.01 to 50 mmol/g, and more preferably from 0.1 to 20 mmol/g, in terms of a molar amount of the functional group per g of the organic polymer.

The functional group-carrying organic polymer can be obtained, for example, by homopolymerizing a monomer having the active hydrogen-carrying functional group or the functional group of a non-proton-donating Lewis base and more than one polymerizable unsaturated group, or copolymerizing said monomer and another monomer having a polymerizable unsaturated group. At this time, it is preferred to additionally copolymerize a crosslinking polymerizable monomer having two or more polymerizable unsaturated groups.

Examples of the monomer having the active hydrogen-carrying functional group or the functional group of a non-proton-donating Lewis base and more than one polymerizable unsaturated group are monomers having the above-mentioned active hydrogen-carrying functional group and more than one polymerizable unsaturated group, and monomers having the above-mentioned functional group having a Lewis base portion containing no active hydrogen and more than one polymerizable unsaturated group. Examples of the polymerizable unsaturated group are an alkenyl groups such as a vinyl group and an allyl group, and an alkynyl group such as an ethyne group.

Examples of the monomer having the active hydrogen-carrying functional group and more than one polymerizable unsaturated group are a vinyl group-containing primary amine, a vinyl group-containing secondary amine, a vinyl group-containing amide compound and a vinyl group-containing hydroxy compound. Specific examples thereof are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol and 2-propen-1-ol and 3-buten-1-ol.

Specific examples of the monomer having the functional group having a Lewis base portion containing no active hydrogen and more than one polymerizable unsaturated group are vinylpyridine, vinyl(N-substituted)imidazole and vinyl(N-substituted)indazole.

The other monomers having a polymerizable unsaturated group include ethylene, α-olefins and aromatic vinyl compounds, and specific examples thereof are ethylene, propylene, 1-butene, 1-hexene, 4-methyl-1-pentene and styrene. Preferred is ethylene or styrene. These monomers may be used in a combination of two or more.

As specific examples of the crosslinking polymerizable monomer having two or more polymerizable unsaturated groups, divinylbenzene can be given.

A median particle diameter of the organic polymer is preferably from 5 to 1000 µm, and more preferably from 10 to 500 µm. A pore volume is preferably not less than 0.1 ml/g, and more preferably 0.3 to 10 ml/g. A specific surface area is preferably from 10 to 1000 m²/g, and more preferably from 50 to 500 m²/g.

It is preferable that these organic polymers are dried to contain substantially no water, and those dried by heat-treatment are preferred. The heat-treatment of organic polymers, whose water content cannot be visually confirmed, is usually carried out at a temperature of from 30 to 400° C., preferably from 50 to 200° C., and more preferably from 70 to 150° C. The heating time is not particularly limited, and preferably from 30 minutes to 50 hours, more preferably from 1 hour to 30 hours. Further, during heating, there can be used a method of passing a dried inert gas (e.g. nitrogen or argon) at a fixed flow rate, or a method of evacuating. The method is not limited thereto.

The modified particle in accordance with the present invention is a modified particle obtained by contacting the above-mentioned (a), (b) and (c) with one another. An order for contacting (a), (b) and (c) is not particularly limited, and the following orders are enumerated.

<1> A contact product obtained by contacting a contact product between (a) and (b) with (c).
<2> A contact product obtained by contacting a contact product between (a) and (c) with (b).
<3> A contact product obtained by contacting a contact product between (b) and (c) with (a).

A preferable contact order is the above-mentioned <1> or <2>, and the most preferable is <1>.

It is preferable to carry out the contact treatment under an inert gas atmosphere. A treating temperature is usually from −100 to 300° C., and preferably from −80 to 200° C. A treating time is usually from 1 minute to 200 hours, and preferably from 10 minutes to 100 hours. It is permitted to carry out such a treatment using a solvent or directly treat the compounds without use of any solvent.

Examples of solvents usable are non-polar solvents such as aliphatic hydrocarbon solvents and aromatic hydrocarbon solvents; and polar solvents such as halogenide solvents and ether solvents. Specific examples thereof include aliphatic hydrocarbon solvents such as butane, pentane, hexane, heptane, octane, 2,2,4-trimethylpentane and cyclohexane; aromatic hydrocarbon solvents such as benzene, toluene and xylene; halogenide solvents such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; ether solvents such as dimethyl ether, diethyl ether, diisopropyl ether, di-n-butyl ether, methyl-tert-butyl ether, anisole, 1,4-dioxane, 1,2-dimethoxyethane, bis (2-methoxyethyl) ether, tetrahydrofuran and tetrahydropyran.

An amount used of the compound (b) to the compound (a) is not particularly limited. However, it is preferred that a molar ration substantially satisfies a number of 0.1 to 8. The number is more preferably 1 to 6, further preferably 2 to 4, and most preferably 2.5 to 3.5.

In preparation of the modified particle in accordance with the present invention, it is permitted to appropriately determine a proportion of (c) to (a), provided that a bismuth atom originated from (a) and contained in a particle obtained by contacting (a) and (c) with each other is controlled so as to be preferably not less than 0.1 mmol, and more preferably from 0.5 to 20 mmol, in terms of a mol number of a bismuth atom contained in 1 g of the obtained particle.

As a result of such a contact treatment, at least one of the starting (a), (b) and/or (c) may remain as an unreacted material in the modified particle of the present invention. But, when it is applied to polymerization accopanying formation of addition polymer particles, it is preferable to conduct washing for prevopusly removing the unreacted material. A solvent used therefor mey be the same or differnt from the solvent used at the time of contact. Such the washing is preferably carried out under atmosphre of an inert gas. A treating temperature is usually −100 to 300° C., preferably −80 to 200° C. A treating time is usually 1 minute to 200 hours, preferably 10 minutes to 100 hours.

Further, after completion of such the contact treatment and washing, preferably, the solvent is removed from the product by distillation, and the resulting product is dried under reduced pressure at a temperature of not lower than 25° C. for 1 to 24 hours, more preferably at a temperature of from 40 to 200° C. for 1 to 24 hours, much more preferably at a temperature of from 60 to 200° C. for 1 to 24 hours, particularly preferably at a temperature of from 60 to 160° C. for 2 to 18 hours and the most preferably at a temperature of from 80 to 160° C. for 4 to 18 hours.

A specific example of a process for producing the modified particle in accordance with the present invention is explained in more detail as follows, wherein the compound (a) is triphenyl bismuth, the compound (b) is pentafluorophenol, and the particle (c) is silica. Touene is used as a solvent, triphenyl bismuth is added thereto, a toluene solution of pentafluorophenol of 3 mol to 1 mol of bismuth is added dropwise thereto, and then stirring is carried out under refluxing for 10 minutes to 24 hours after stirring at room temperature for 10 minutes to 24 hours. Thereafter, the solution is concentrated, and a precipitated solid component is filtered and dried.

To a solid component obtained through the above-mentioned operations, toluene and silica are added, and the mixture is stirred at 80° C. for 2 hours. The resulting solid component is washed with toluene, and dried under reduced pressure.

The modified particle of the present invention can be thus produced.

The modified particle in accordance with the present invention is useful as a catalyst component for addition polymerization (particularly, the catalyst component for olefin polymerization) As the catalyst for addition polymerization in accordance with the present invention, there are exemplified a catalyst for addition polymerization obtained by contacting the above-mentioned modified particle (A) of the present invention obtained by contacting the above (a) with (b), with a metal compound (B) of the Groups 3 to 11 or lanthanoide series, and a catalyst for addition polymerization obtained by contacting the above-mentioned modified particle (A) of the present invention, a transition metal compound (B) of the Groups 3 to 11 or lanthanoide series and an organoaluminum compound (C). The latter is higher in activity and more preferred.

The catalyst for addition polymerization is explained below in more detail.

(B) Transition Metal Compound of the Groups 3 to 11 or Lanthanoide Series

As the transition metal compound (B) of the Groups 3 to 11 or lanthanoide series used for the catalyst for addition polymerization in accordance with the present invention, a transition metal compound capable of forming a single site catalyst is used. It is not particularly limited as far as it is a transition metal compound of the Groups 3 to 11 or lanthanoide series, and exhibits addition polymerization activity when used in combination with the above-mentioned modified particle (A) (and additionally organoaluminum compound (C)) as a co-catalyst component for activation use.

Besides, herein, "single-site catalyst" is a conception distinctable from "conventional solid catalyst" and includes not only a single-site catalyst in a narrow sense, which can obtain a addition polymer having a narrow molecular weight distribution and narrow composition distribution in a copolymer, but also a catalyst which can obtain an addition polymer having a wide molecular weight distribution and a wide composition distribution in a copolymer if the catalyst is obtained by a method similar to the preparation method of such a single-site catalyst in a narrow sense.

As such a transition metal compound (B), preferred is a transition metal compound represented by the following formula [3] or its μ-oxo type transition metal compound dimer.

$$L^2{}_a M X^1{}_b \qquad [3]$$

(wherein M is a transition metal atom of the Groups 3 to 11 or lanthanoide series, $L^2$ is a cyclopentadienyl type anion skeleton-carrying group or a hetero atom-containing group, more than one $L^2$ may be linked directly or through a residual group containing a carbon atom, a silicone atom, a nitrogen atom, an oxygen atom, a sulfur atom or a phosphorus atom, $X^1$ is a halogen atom or a hydrocarbon group (provided that a cyclopentadienyl type anion skeleton-carrying group is excluded) or OR (R represents a hydrocarbon group or halogenated hydro carbon group, and when more than one R, they may be the same or different each other), a is a number satisfying $0<a\leq 8$, and b is a number satisfying $0<b\leq 8$.)

In the formula [3], M is a transition metal atom of the Groups 3 to 11 of the periodic table (IUPAC 1989) or lanthanoide series. Examples thereof are a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and an ytterbium atom. Preferred as M in the formula [3] is a titanium atom, a zirconium atom, a hafnium atom, a vanadium atom, a chromium atom, an iron atom, a cobalt atom or a nickel atom, and particularly preferred is a titanium atom, a zirconium atom or a hafnium atom.

In the formula [3], $L^2$ is a cyclopentadienyl type anion skeleton-carrying group or a hetero atom-containing group, and more than one $L^2$ may be the same or different from one another. Further, more than one $L^2$ may be linked directly or through a residual group containing a carbon atom, a silicone atom, a nitrogen atom, an oxygen atom, a sulfur atom or a phosphorus atom.

Examples of the cyclopentadienyl type anion skeleton-carrying group as $L^2$ are $\eta^5$-(substituted) cyclopentadienyl groups, $\eta^5$-(substituted)indenyl groups and $\eta^5$-(substituted) fluorenyl groups. Specific examples thereof are an $\eta^5$-cyclopentadienyl group, an $\eta^5$-methylcyclopentadienyl group, an $\eta^5$-ethylcyclopentadienyl group, an $\eta^5$-n-butylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-methyl-2-ethylcyclopentadienyl group, an $\eta^5$-1-methyl-3-ethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1-methyl-2-n-butylcyclopentadienyl group, an $\eta^5$-1-methyl-3-n-butylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, an $\eta^5$-2,7-di-tert-butylfluorenyl group and their substitution compounds.

Incidentally, in the present specification, "$\eta^5$-" in the name of the transition metal compound may be omitted in some cases.

The hetero atom in the above hetero atom-containing group includes an oxygen atom, a sulfur atom, a nitrogen atom and a phosphorus atom. Examples of such a group are preferably an alkoxy group, an aryloxy group, a thioalkoxy group, a thioaryloxy group, an alkylamino group, an arylamino group, an alkylphosphino group, an arylphosphino group, a chelating ligand, and an aromatic or aliphatic heterocyclic group having an oxygen atom, a sulfur atom, a nitrogen atom and/or a phosphorus atom in the ring.

Specific examples of the hetero atom-containing group are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, a catecholato group, a 2-hydroxyphenoxy group, a resorcinolate group, a 3-hydroxyphenoxy group, a 4-isopropylcatecolate group, a 4-isopropyl-2-hydroxyphenoxy group, a 3-methoxycatecolate group, a 3-methoxy-2-hydroxyphenoxy group, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group and a 4,4',6,6'-tetramethyl-2,2'-isobutylidenediphenoxy group.

Further, as the above-mentioned hetero atom-containing group, there is exemplified a group represented by the following formula [4].

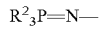

$R^2{}_3P=N-$ [4]

(In the formula, respective $R^2$'s are independently of one another a hydrogen atom, a halogen atom or a hydrocarbon group, and may be the same or different from one another, and two or more thereof may be bound with one another and may form a ring.)

Specific examples of $R^2$ in the above formula [4] are a hydrogen atom, a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group, but are not limited thereto.

Furthermore, as the hetero atom-containing group, there is also exemplified a group represented by the following formula [5].

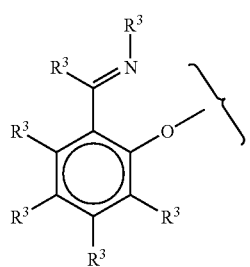

[5]

(In the formula, respective $R^3$'s are independently of one another a hydrogen atom, a halogen atom, a hydrocarbon group, a halogenated hydrocarbon group, a hydrocarbyloxy group, a silyl group or an amino group, and may be the same or different from one another, and two or more thereof may be bound with one another and may form a ring.)

Specific examples of $R^3$ in the formula [5] are a hydrogen atom, a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoropmethylphenyl group, a 4-methoxyphenyl group, a 4-pyridyl group, a cyclohexyl group, a 2-isoprpylphenyl group, a benzyl group, a methyl group, a triethylsilyl group, a diphenylmethylsilyl group, a 1-methyl-1-phenylethyl group, a 1,1-dimethylpropyl group and a 2-chlorophenyl group, but are not limited thereto.

The above-mentioned chelating ligand means a ligand having more than one coordinating position. Specific examples thereof are acetylacetonate, diimine, oxazoline, bisoxazoline, terpyridine, acylhydrazone, diethylenetriamine, triethylenetetramine, porphyrin, crown ether and cryptate.

Specific examples of the above-mentioned heterocyclic group are a pyridyl group, an N-substituted imidazolyl group and an N-substituted indazolyl group. Preferable is a pyridyl group.

Two cyclopentadienyl type anion skeleton-carrying groups, the cyclopentadienyl type anion skeleton-carrying group and the hetero atom-containing group, or two hetero atom-containing groups may be bound to each other directly or through a residual group containing at least one selected from the group consisting of a carbon atom, a silicone atom, a nitrogen atom, an oxygen atom, a sulfur atom and a phosphorus atom, respectively. As such a residual group, preferred is a divalent residual group in which an atom binding two $L^2$s is a carbon atom, a silicone atom, a nitrogen atom, an oxygen atom, a sulfur atom and/or a phosphorus atom. More preferred is a divalent residual group in which an atom binding two $L^2$s is a carbon atom, a silicone atom, a nitrogen atom, an oxygen atom, a sulfur atom and/or a phosphorus atom, provided that a minimum atom number of the atom binding two $L^2$s is not more than 3 (a case where the atom binding two $L^2$s is single is included). Specific examples thereof are alkylene groups such as a methylene group, an ethylene group and a propylene group; substituted alkylene groups such as a dimethylmethylene group (an isoprolidene group) and a diphenylmethylene group, a silylene group; substituted silylene group such as a dimethylsilylene group, a diethylsilylene group, a diphenylsilylene group and a tetramethyldisilylene group, dimethoxysililene group; and a hetero atom such as a nitrogen atom, an oxygen atom, a sulfur atom and a phosphorus atom. Particularly preferred are a methylene group, an ethylene group, a dimethylmethylene group (an isopropylidene group), a diphenylmethylene group, a dimethylsilylene group, a diethylsilylene group, a diphenylsilylene group and a dimethoxysilylene group.

In the formula [3], $X^1$ is a halogen atom or a hydrocarbon group or a OR. Specific examples of the halogen atom are a fluorine atom, a chlorine atom, a bromine atom and an iodine atom. Examples of the hydrocarbon group stated here are a methyl group, an ethyl group, a n-propyl group, an isopropyl group, a n-butyl group, a phenyl group and a benzyl group. Preferable $X^1$ is a halogen atom, an alkyl group having 1 to 20 carbon atoms, an aralkyl group having 7 to 20 carbon atoms, an aryl group having 6 to 20 carbon atoms or an alkenyl group having 3 to 20 carbon atoms.

Examples of the alkyl group having 1 to 20 carbon atoms include a methyl group, ethyl group, n-propyl group, isopropyl group, n-butyl group, sec-butyl group, tert-butyl group, isobutyl group, n-pentyl group, neopentyl group, isoamyl group, n-hexyl group, n-octyl group, n-decyl group, n-dodecyl group, n-pentadecyl group, n-eicosyl group and the like, and a methyl group, ethyl group, isopropyl group, tert-butyl group, isobutyl group or isoamyl group is more preferable.

All of these alkyl groups may be substituted with a halogen atom such as a fluorine atom, a chlorine atom, a bromine atom or an iodine atom. Examples of the alkyl group having 1 to 10 carbon atoms which is substituted with the halogen atom, include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group and the like.

Further, all of these alkyl groups may be partially substituted with an alkoxy group such as a methoxy group, an ethoxy group or the like, an aryloxy group such as a phenoxy group or the like or an aralkyloxy group such as a benzyloxy group or the like, etc.

Examples of the aralkyl group having 7 to 20 carbon atoms include a benzyl group, a (2-methylphenyl)methyl group, a (3-methylphenyl)methyl group, a (4-methylphenyl) methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl) methyl group, a (2,3,4-timethylphenyl)methyl group, a (2,3,5-timethylphenyl)methyl group, a (2,3,6-timethylphenyl) methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl) methyl group, a naphthylmethyl group, an anthracenylmethyl group and the like, and a benzyl group is more preferable.

All of these aralkyl groups may be partially substituted with a halogen atom such as a fluorine atom, a chlorine atom, a bromine atom or an iodine atom, an alkoxy group such as a methoxy group, an ethoxy group or the like, an aryloxy group such as a phenoxy group or the like or an aralkyloxy group such as a benzyloxy group or the like, etc.

Examples of the aryl group having 6 to 20 carbon atoms include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like, and a phenyl group is more preferable.

All of these aryl groups may be partially substituted with a halogen atom such as a fluorine atom, a chlorine atom, a bromine atom or, an iodine atom or the like, an alkoxy group such as a methoxy group, an ethoxy group or the like, an aryloxy group such as a phenoxy group or the like or an aralkyloxy group such as a benzyloxy group or the like, etc.

Examples of the alkenyl group having 3 to 20 carbon atoms include an allyl group, a methallyl group, a crotyl group, a 1,3-diphenyl-2-propenyl group and the lile, and an allyl group and a methallyl group are more preferable.

R in OR is a hydrocarbon group, and the hydrocarbon group preferably includes an alkyl group, an aralkyl group, an aryl group and the like, preferably an alkyl group having 1 to 20 carbon atoms, an aralkyl group having 7 to 20 carbon atoms and an aryl group having 6 to 20 carbon atoms. Specific examples thereof include the same groups as described above.

Examples of R more preferably include a methyl group, an ethyl group, an isopropyl group, a tert-butyl group, an isobutyl group, a phenyl group, a 2,6-di(tert-butyl)phenyl group and benzyl group, further preferably a methyl group, a phenyl group, a 2,6-di(tert-butyl)phenyl group and benzyl group, most preferably a phenyl group.

Examples of more preferable $X^1$ include a chlorine atom, a methyl group, an ethyl group, a n-propyl group, an isopropyl group, a n-butyl group, a benzyl group, an allyl group and methallyl group.

In the formula [3], a is a number satisfying $0<a\leq 8$, b is a number satisfying $0<b\leq 8$, and both are appropriately selected depending on a valence of M.

In the transition metal compound represented by the formula [3], specific examples of those having a titanium atom, a zirconium atom or a hafnium metal as the transition metal atom are bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis (ethylmethylcyclopentadienyl)titanium dichloride, bis(trimethylcyclopentadienyl) titanium dichloride, bis(tetramethylcyclopentadienyl) titanium dichloride, bis(pentamethylcyclopentadienyl) titanium dichloride, bis-(indenyl)titanium dichloride, bis(4,5,6,7-tetrahydroindenyl)titanium dichloride, bis(fluorenyl) titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl) titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl (2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis(3-methylcyclopentadienyl)titanium dichloride, dimethylsilylenebis(2-n-butylcyclopentadienyl)titanium dichloride, dimethylsilylenebis (3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis (3,4-dimethylcyclopentadienyl)titanium dichloride, dimethylsilylenebis(2,3-ethylmethylcyclopentadienyl) titanium dichloride, dimethylsilylenebis(2,4-ethylmethylcyclopentadienyl)titanium dichloride, dimethylsilylenebis (2,5-ethylmethylcyclopentadienyl)titanium dichloride, dimethyl silylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethyl silylenebis(indenyl)titanium dichloride, dimethyl silylenebis(2-methylindenyl)titanium dichloride, dimethyl silylenebis(2-tert-butylindenyl)titanium dichloride, dimethyl silylenebis(2,3-dimethylindenyl)titanium dichloride, dimethyl silylenebis(2,4,7-trimethylindenyl)titanium dichloride, dimethyl silylenebis(2-methyl-4-isopropylindenyl)titanium dichloride, dimethyl silylenebis(4,5-benzindenyl)titanium dichloride, dimethyl silylenebis(2-methyl-4,5-benzindenyl)titanium dichloride, dimethyl silylenebis(2-phenylindenyl)titanium dichloride, dimethyl silylenebis(4-phenylindenyl)titanium dichloride, dimethyl silylenebis(2-methyl-4-phenylindenyl)titanium dichloride, dimethyl silylenebis(2-methyl-5-phenylindenyl)titanium dichloride, dimethyl silylenebis(2-methyl-4-naphtylindenyl)titanium dichloride, dimethylsilylene bis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene(cyclopentadienyl)(fluorenyl)titanium dichloride, dimethylsilylene(methylcyclopentadienyl)(fluorenyl) titanium dichloride, dimethylsilylene(n-butylcyclopentadienyl)(fluorenyl)titanium dichloride, dimethyl silylene(tetramethylcyclopentadienyl)(indenyl)titanium dichloride, dimethylsilylene(indenyl)(fluorenyl)titanium dichloride, dimethylsilylene(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, cyclopentadienyltitanium trichloride, pentamethylcyclopentadienyltitanium trichloride, cyclopentadienyl(dimethylamide)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-tert-butylphenyl)titanium dichloride, indenyl(2,6-diisopropylphenyl)titanium dichloride, fluorenyl(2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride, dimethylsilylene(cyclopentadienyl)(1-naphtoxy-2-yl)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy) titanium dichloride, dimethylsilylene(methylcyclopentadienyl)(1-naphtoxy-2-yl)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphtoxy-2-yl)titanium dichloride, dimethylsilylene(tert-butylcyclopentadienyl)(2-phenoxy) titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy) titanium dichloride, dimethylsilylene(tert-butylcyclopentadienyl)(3-tert-butyl-5-methyl-2-phenoxy) titanium dichloride, dimethylsilylene(tert-butylcyclopentadienyl)(3,5-di-tert-butyl-2-phenoxy) titanium dichloride, dimethylsilylene (tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-diamyl-2-phenoxy) titanium dichloride, dimethylsilylene(tert-butylcyclopentadienyl)(3-phenyl-2-phenoxy)titanium dichloride, dimethylsilylene (tert-butylcyclopentadienyl)(1-naphtoxy-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy) titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy) titanium dichloride, dimethylsilylene(tetramethycyclopentadienyl)(3-phenyl-2-phenoxy)titanium dichloride, dimethylsilylene(tetramethylcyclopentadienyl)(1-naphtoxy-2-yl) titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy) titanium dichloride, dimethylsilylene(trimethylsilylcyclopentadienyl)(3-tert-butyl-2-phenoxy) titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy) titanium dichloride, dimethylsilylene(trimethylsilylcyclopentadienyl)(3-phenyl-2-phenoxy) titanium dichloride, dimethylsilylene(trimethylsilylcyclopentadienyl)(1-naphtoxy-2-yl)titanium dichloride, dimethylsilylene(indenyl)(2-phenoxy)titanium dichloride, dimethylsilylene(indenyl)(3-methyl-2-phenoxy) titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyl dimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphtoxy-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl) (5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphtoxy-2-yl)titanium dichloride, (tert-butylamide)tetramethylcyclopentadienyl-1,2-ethanediyl titanium dichloride, (methylamide)tetramethylcyclopentadienyl-1,2-ethanediyl titanium dichloride, (ethylamide)tetramethylcyclopentadienyl-1,2-ethanediyl titanium dichloride, (tert-butylamide)tetramethylcyclopentadienyldimethylsilane titanium dichloride, (benzylamide)tetramethylcyclopentadienyldimethylsilane titanium dichloride, (phenylphosphide)tetramethylcyclopentadienyldimethylsilane titanium dichloride, (tert-butylamide)indenyl-1,2-ethanediyl titanium dichloride, (tert-butylamide)tetrahydroindenyl-1,2-ethanediyltitanium dichloride, (tert-butylamide)fluorenyl-1,2-ethanediyl titanium dichloride, (tert-butylamide)indenyldimethylsilane titanium dichloride, (tert-butylamide)tetrahydroindenyldimethylsilane titanium dichloride, (tert-butylamide)fluorenyldimethylsilane titanium dichloride, (dimethylaminomethyl)tetramethylcyclopentadienyl titanium (III) dichloride, (dimethylaminoethyl)tetramethylcyclo-pentadienyl titanium(III) dichloride, (dimethylaminopropyl) tetramethylcyclopentadienyl titanium(III) dichloride, (N-pyrrolidinylethyl)tetramethylcyclopentadienyl titanium dichloride, (B-dimethylaminoborabenzene)cyclopentadienyl-titanium dichloride, cyclopentadienyl(9-mesitylboraanthracenyl)titanium dichloride, 2,2'-thiobis[4-methyl-6-tert-butylphenoxy]titanium dichloride, 2,2'-thiobis[4-methyl-6-(1-methylethyl)phenoxy]titanium dichloride, 2,2'-thiobis(4,6-dimethylphenoxy)titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamide)titanium dichloride, (dicyclohexyl-1,3-propanediamide)titanium dichloride, [bis(trimethylsilyl)-1,3-propanedidiamide]titanium dichloride, [bis(tert-butyldimethylsilyl)-1,3-propanediamide]titanium dichloride, [bis(2,6-dimethylphenyl)-1,3-propanediamide]titanium dichloride, [bis(2,6-diisopropylphenyl)-1,3-propanediamide]titanium dichloride, [bis(2,6-di-tert-butylphenyl)-1,3-propanediamide]titanium dichloride, [bis(triisopropylsilyl)naphthalenediamide]titanium dichloride, [bis(trimethylsilyl)naphthalenediamide]titanium dichloride, [bis(tert-butyldimethylsilyl)naphthalenediamide]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl)methyl]titanium trichloride, [tris(3,5-diethylpyrazolyl)methyl]titanium trichloride, [tris(3,5-di-tert-butylpyrazolyl)methyl]titanium trichloride, and those formed by replacing the titanium of these compounds with zirconium or hafnium, those formed by replacing the 2-phenoxy of these compounds with (3-phenyl-2-phenoxy), (3-trimethylsilyl-2-phenoxy) or (3-tert-butyldimethylsilyl-2-phenoxy), those formed by replacing the dimethylsilylene of these compounds with methylene, ethylene, dimethylmethylene(isopropylidene), diphenylmethylene, diethylsilylene, diphenylsilylene or dimethoxysilylene, those formed by replacing the dichloride of these compounds with difluoride, dibromide, diiodide, dimethyl, diethyl, diisopropyl, diphenyl, dibenzyl, dimethoxide, diethoxide, di-n-propoxide, diisopropoxide, di-n-butoxide, diisobutoxide, di-tert-butoxide, diphenoxide or di(2,6-di-tert-butylphenoxide), and those formed by replacing the trichloride of these compounds with trifluoride, tribromide, triiodide, trimethyl, triethyl, triisopropyl, triphenyl, tribenzyl, trimethoxide, triethoxide, tri-n-propoxide, triisopropoxide, tri-n-butoxide, triisobutoxide, tri-tert-butoxide, triphenoxide or tri(2,6-di-tert-butylphenoxide).

In the transition metal compounds represented by the formula [3], specific examples of a compound having a nickel atom as a transition metal atom are 2,2'-methylenebis[(4R)-4-phenyl-5,5'-dimethyloxazoline]nickel dibromide, 2,2'-methylenebis[(4R)-4-phenyl-5,5'-diethyloxazoline] nickel dibromide, 2,2'-methylenebis[(4R)-4-phenyl-5,5'-di-n-propyloxazoline]nickel dibromide, 2,2'-methylenebis [(4R)-4-phenyl-5,5'-diisopropyloxazoline]nickel dibromide, 2,2'-methylenebis[(4R)-4-phenyl-5,5'-dicyclohexyloxazoline]nickel dibromide, 2,2'-methylenebis[(4R)-4-phenyl-5,5'-dimethoxyoxazoline]nickel dibromide, 2,2'-methylenebis[(4R)-4-phenyl-5,5'-diethoxyoxazoline]nickel dibromide, 2,2'-methylenebis[(4R)-4-phenyl-5,5'-diphenyloxazoline] nickel dibromide, 2,2'-methylenebis[(4R)-4-methyl-5,5'-di-(2-methylphenyl)oxazoline]nickel dibromide, 2,2'-methylenebis[(4R)-4-methyl-5,5-di-(3-methylphenyl)oxazoline] nickel dibromide, 2,2'-methylenebis[(4R)-4-methyl-5,5-di-(4-methylphenyl)oxazoline]nickel dibromide, 2,2'-methylenebis[(4R)-4-methyl-5,5-di-(2-methoxyphenyl) oxazoline]nickel dibromide, 2,2'-methylenebis[(4R)-4-methyl-5,5-di-(3-methoxyphenyl)oxazoline]nickel dibromide, 2,2'-methylenebis[(4R)-4-methyl-5,5-di-(4-methoxyphenyl)oxazoline]nickel dibromide, 2,2'-methylenebis[spiro{(4R)-4-methyloxazoline-5,1'-cyclobutane}] nickel dibromide, 2,2'-methylenebis[spiro{(4R)-4-methyloxazoline-5,1'-cyclopentane}]nickel dibromide, 2,2'-methylenebis[spiro{(4R)-4-methyloxazoline-5,1'-cyclohexane)]nickel dibromide, 2,2'-methylenebis[spiro{(4R)-4-methyloxazoline-5,1'-cycloheptane}]nickel dibromide, 2,2'-methylenebis[(4R)-4-isopropyl-5,5-dimethyloxazoline]nickel dibromide, 2,2'-methylenebis[(4R)-4-isopropyl-5,5-diethyloxazoline]nickel dibromide, 2,2'-methylenebis [(4R)-4-isopropyl-5,5-di-n-propyloxazoline], methylenebis [(4R)-4-isopropyl-5,5-diisopropyloxazoline] nickel dibromide, 2,2'-methylenebis[(4R)-4-isopropyl-5,5-dicyclohexyloxazoline]nickel dibromide, 2,2'-methylenebis [(4R)-4-isopropyl-5,5-diphenyloxazoline]nickel dibromide, 2,2'-methylenebis[(4R)-4-isopropyl-5,5-di-(2-methylphenyl)oxazoline]nickel dibromide, 2,2'-methylenebis[(4R)-4-isopropyl-5,5-di-(3-methylphenyl)oxazoline]nickel dibromide, 2,2'-methylenebis[(4R)-4-isopropyl-5,5-di-(4-methylphenyl)oxazoline]nickel dibromide, 2,2'-methylenebis[(4R)-4-isopropyl-5,5-di-(2-methoxyphenyl) oxazoline]nickel dibromide, 2,2'-methylenebis[(4R)-4-isopropyl-5,5-di-(3-methoxyphenyl)oxazoline]nickel dibromide, 2,2'-methylenebis[(4R)-4-isopropyl-5,5-di-(4-methoxyphenyl)oxazoline]nickel dibromide, 2,2'-methylenebis[spiro{(4R)-4-isopropyloxazoline-5,1'-cyclobutane}] nickel dibromide, 2,2'-methylenebis[spiro{(4R)-4-isopropyl-oxazoline-5,1'-cyclopentane}]nickel dibromide, 2,2'-methylenebis[spiro{(4R)-4-isopropyloxazoline-5,1'-cyclohexane}]nickel dibromide, 2,2'-methylenebis[spiro{(4R)-4-isopropyloxazoline-5,1'-cycloheptane}]nickel dibromide, 2,2'-methylenebis[(4R)-4-isobutyl-5,5-dimethyloxazoline]nickel dibromide, 2,2'-methylenebis [(4R)-4-isobutyl-5,5-diethyloxazoline]nickel dibromide, 2,2'-methylenebis[(4R)-4-isobutyl-5,5-di-n-propyloxazoline]nickel dibromide, 2,2'-methylenebis[(4R)-4-isobutyl-5,5-di-isopropyloxazoline]nickel dibromide, 2,2'-methylenebis[(4R)-4-isobutyl-5,5-dicyclohexyloxazoline]nickel dibromide, 2,2'-methylenebis[(4R)-4-isobutyl-5,5-diphenyloxazoline]nickel dibromide, 2,2'-methylenebis[(4R)-4-isobutyl-5,5-di-(2-methylphenyl)oxazoline]nickel dibromide, 2,2'-methylenebis[(4R)-4-isobutyl-5,5-di-(3-methylphenyl)oxazoline]nickel dibromide, 2,2'-methylenebis[(4R)-4-isobutyl-5,5-di-(4-methylphenyl) oxazoline]nickel dibromide, 2,2'-methylenebis[(4R)-4-isobutyl-5,5-di-(2-methoxyphenyl)oxazoline]nickel dibromide, 2,2'-methylenebis[(4R)-4-isobutyl-5,5-di-(3-methoxyphenyl)oxazoline]nickel dibromide, 2,2'-methylenebis[(4R)-4-isobutyl-5,5-di-(4-methoxyphenyl)oxazoline]nickel dibromide, 2,2'-methylenebis [spiro{(4R)-4-isobutyloxazoline-5,1'-cyclobutane}]nickel dibromide, 2,2'-methylenebis[spiro{(4R)-4-isobutyloxazoline-5,1'-cyclopentane}]nickel dibromide, 2,2'-methylenebis[spiro{(4R)-4-isobutyloxazoline-5,1'-cyclohexane}]nickel dibromide, 2,2'-methylenebis[spiro{(4R)-4-isobutyloxazoline-5,1'-cycloheptane}]nickel dibromide, 2,2'-methylenebis[(4R)-4-tert-butyl-5,5-dimethyloxazoline]nickel dibromide, 2,2'-methylenebis[(4R)-4-tert-butyl-5,5-diethyloxazoline] nickel dibromide, 2,2'-methylenebis[(4R)-4-4-tert-butyl-5,5-di-n-propyl oxazoline]nickel dibromide, 2,2'-methylenebis[(4R)-4-tert-butyl-5,5-di-isopropyloxazoline]nickel dibromide, 2,2'-methylenebis[(4R)-4-tert-butyl-5,5-diphenyloxazoline]nickel dibromide, 2,2'-methylenebis[(4R)-4-tert-butyl-5,5-dicyclohexyloxazoline]nickel dibromide, 2,2'-methylenebis[(4R)-4-tert-butyl-5,5-di-(2-methylphenyl) oxazoline]nickel dibromide, 2,2'-methylenebis[(4R)-4-tert-butyl-5,5-di-(3-methylphenyl)oxazoline]nickel dibromide, 2,2'-methylenebis[(4R)-4-tert-butyl-5,5-di-(4-methylphenyl)oxazoline]nickel dibromide, 2,2'-methylenebis[(4R)-4-tert-butyl-5,5-di-(2-methoxyphenyl)oxazoline]nickel dibromide, 2,2'-methylenebis[(4R)-4-tert-butyl-5,5-di-(3-methoxyphenyl)oxazoline]nickel dibromide, 2,2'-methylenebis[(4R)-4-tert-butyl-5,5-di-(4-methoxyphenyl) oxazoline]nickel dibromide, 2,2'-methylenebis[spiro(4R)-4-tertbutyloxazoline-5,1'-cyclobutane}]nickel dibromide, 2,2'-methylenebis[spiro{(4R)-4-tert-butyloxazoline-5,1'-cyclopentane}]nickel dibromide, 2,2'-methylenebis[spiro{(4R)-4-tert-butyloxazoline-5,1'-cyclohexane}]nickel dibromide, 2,2'-methylenebis[spiro{(4R)-4-tert-butyloxazoline-5,1'-cycloheptane}]nickel dibromide, 2,2'-methylenebis [(4R)-4-phenyl-5,5-dimethyloxazoline]nickel dibromide, 2,2'-methylenebis[(4R)-4-phenyl-5,5-diethyloxazoline] nickel dibromide, 2,2'-methylenebis[(4R)-4-phenyl-5,5-di-n-propyloxazoline]nickel dibromide, 2,2'-methylenebis [(4R)-4-phenyl-5,5-di-isopropyloxazoline]nickel dibromide, 2,2'-methylenebis[(4R)-4-phenyl-5,5-dicyclohexyloxazoline]nickel dibromide, 2,2'-methylenebis[(4R)-4-phenyl-5,5-diphenyloxazoline]nickel dibromide, 2,2'-methylenebis[(4R)-4-phenyl-5,5-di-(2-methylphenyl) oxazoline]nickel dibromide, 2,2'-methylenebis[(4R)-4-phenyl-5,5-di-(3-methylphenyl)oxazoline]nickel dibromide, 2,2'-methylenebis[(4R)-4-phenyl-5,5-di-(4-methylphenyl) oxazoline]nickel dibromide, 2,2'-methylenebis[(4R)-4-phenyl-5,5-di-(2-methoxyphenyl)oxazoline]nickel dibromide, 2,2'-methylenebis[(4R)-4-phenyl-5,5-di-(3-methoxyphenyl) oxazoline]nickel dibromide, 2,2'-methylenebis[(4R)-4-phenyl-5,5-di-(4-methoxyphenyl)oxazoline]nickel dibromide, 2,2'-methylenebis[spiro{(4R)-4-phenyloxazoline-5,1'-cyclobutane}]nickel dibromide, 2,2'-methylenebis[spiro{(4R)-4-phenyloxazoline-5,1'-cyclopentane}]nickel dibromide, 2,2'-methylenebis[spiro{(4R)-4-phenyloxazoline-5,1'-cyclohexane}]nickel dibromide, 2,2'-methylenebis[spiro{(4R)-4-phenyloxazoline-5,1'-cycloheptane}]nickel dibromide, 2,2'-methylenebis[(4R)-4-benzyl-5,5-dimethyloxazoline]nickel dibromide, 2,2'-methylenebis[(4R)-4-benzyl-5,5-diethyloxazoline]nickel dibromide, 2,2'-methylenebis[(4R)-4-benzyl-5,5-di-n-propyloxazoline] nickel dibromide, 2,2'-methylenebis[(4R)-4-benzyl-5,5-diisopropyloxazoline]nickel dibromide, 2,2'-methylenebis[(4R)-4-benzyl-5,5-dicyclohexyloxazoline]nickel dibromide, 2,2'-methylenebis[(4R)-4-benzyl-5,5-diphenyloxazoline]nickel dibromide, 2,2'-methylenebis[(4R)-4-benzyl-5,5-di-(2-methylphenyl)oxazoline]nickel dibromide, 2,2'-methylenebis[(4R)-4-benzyl-5,5-di-(3-methylphenyl) oxazoline]nickel dibromide, 2,2'-methylenebis[(4R)-4-benzyl-5,5-di-(4-methylphenyl)oxazoline]nickel dibromide, 2,2'-methylenebis[(4R)-4-benzyl-5,5-di-(2-methoxyphenyl) oxazoline]nickel dibromide, 2,2'-methylenebis[(4R)-4-benzyl-5,5-di-(3-methoxyphenyl)oxazoline]nickel dibromide, 2,2'-methylenebis[(4R)-4-benzyl-5,5-di-(4-methoxyphenyl) oxazoline]nickel dibromide, 2,2'-methylenebis[spiro{(4R)-4-benzyloxazoline-5,1'-cyclobutane}]nickel dibromide, 2,2'-methylenebis[spiro{(4R)-4-benzyloxazoline-5,1'-cyclopentane}]nickel dibromide, 2,2'-methylenebis[spiro{(4R)-4-benzyloxazoline-5,1'-cyclo-hexane}]nickel dibromide, 2,2'-methylenebis[spiro{(4R)-4-benzyloxazoline-5,1'-cycloheptane}]nickel dibromide, and antidopes of the above-mentioned compounds. Further, there are exemplified those formed by reversing a steric configuration of the asymmetric carbon on one hand oxazoline ring of the above-mentioned bisoxazoline compound, and those formed by replacing the dibromide of said compounds with difluoride, dichloride, diiodide, dimethyl, diethyl, diisopropyl, diphenyl, dizenzyl, dimethoxide, diethoxide, di-n-propoxide, diisopropoxide, di-n-butoxide, diisobutoxide, di-tert-butoxide, diphenoxide or di(2,6-di-tert-butylphenoxide).

Further, specific examples of the nickel compound are [hydrotris(3,5-dimethylpyrazolyl)borate]nickel chloride, [hydrotris(3,5-diethylpyrazolyl)borate]nickel chloride, [hydrotris(3,5-di-tert-butylpyrazolyl)borate]nickel chloride and those formed by replacing the dichloride of said compounds with bromide, iodide, methyl, ethyl, allyl, metharyl, methoxide, ethoxide, n-propoxide, isopropoxide, n-butoxide, isobutoxide, tert-butoxide, phenoxide or 2,6-di-tert-butylphenoxide.

Further, compounds represented the following structural formula:

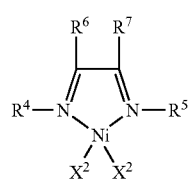

(in the formula, each of $R^4$ and $R^5$ is 2,6-diisopropylphenyl group; each of $R^6$ and $R^7$ is a hydrogen atom or methyl gropup, acenaphthene group in which $R^6$ and $R^7$ are combined; $X^2$ is a fluorine atom, a chlrorine atom, a bromine atom, an iodine atom, a methyl group, an ethyl group, a n-propyl group, an isopropyl group, a n-butyl group, a phenyl group, a benzyl group, a methoxy group, an ethoxy group, a n-propoxy group, an isopropoxy group, a n-butoxy group, an isobutoxy group, or a phenoxy group; and more than one $X^2$ may be the same or different each other.) are illustrated.

Furthermore, there are exemplified compounds obtained by substituting nickel in the above-mentioned nickel compounds with palladium, cobalt, rhodium or ruthenium.

In the transition metal compound represented by the formula [3], specific examples of a compound having an iron atom as a transition metal atom are 2,6-bis-[1-(2,6-dimethylphenylimino)ethyl]pyridine iron dichloride, 2,6-bis-[1-(2,6-diisopropylphenylimino)ethyl]pyridine iron dichloride, 2,6-bis-[1-(2-tert-butyl-phenylimino)ethyl]pyridine iron dichloride, and compounds in which dichloride in those described above is replaced with difluoride, dibromide, diiodide, dimethyl, diethyl, dimethoxide, diethoxide, di-n-propoxide, diisopropoxide, di-n-butoxide, diisobutoxide, di-tert-butoxide, diphenoxide or di(2,6-di-tert-butylphenoxide).

Still further, specific examples of the iron compound are [hydrotris(3,5-dimethylpyrazolyl)borate]iron chloride, [hydrotris(3,5-diethylpyrazolyl)borate]iron chloride, [hydrotris(3,5-di-tert-butylpyrazolyl)borate]iron chloride and those formed by replacing the dichloride of said compounds with fluoride, bromide, iodide, methyl, ethyl, allyl, methallyl, methoxide, ethoxide, n-propoxide, isopropoxide, n-butoxide, isobutoxide, tert-butoxide, phenoxide or 2,6-di-tert-butylphenoxide.

Moreover, there are also similarly exemplified compounds, which are formed by replacing iron in the above-mentioned compounds with cobalt.

Examples of μ-oxo type transition metal compounds in the transition metal compound represented by the formula [3] are μ-oxobis[isopropylidene(cyclopentadienyl) (2-phenoxy)titanium chloride], μ-oxobis[isopropylidene(cyclopentadienyl)(3-tert-butyl-5-methyl-2-phenoxy)titanium chloride], μ-oxobis[isopropylidene(methylcyclopentadienyl)(2-phenoxy)titanium chloride], μ-oxobis[isopropylidene (methylcyclopentadienyl)(3-tert-butyl-5-methyl-2-phenoxy)titanium chloride], μ-oxobis[isopropylidene (tetramethylcyclopentadienyl)(2-phenoxy)titanium chloride], μ-oxobis[isopropylidene(tetramethylcyclopentadienyl)(3-tert-butyl-5-methyl-2-phenoxy)titanium chloride], μ-oxo-bis[dimethylsilylene(cyclopentadienyl)(2-phenoxy) titanium chloride], μ-oxobis[dimethylsilylene(cyclopentadienyl) (3-tert-butyl-5-methyl-2-phenoxy)titaniumchloride], μ-oxo-bis[dimethylsilylene(methylcyclopentadienyl)(2-phenoxy)titanium chloride], μ-oxobis[dimethylsilylene(methylcyclopentadienyl)(3-tert-butyl-5-methyl-2-phenoxy)titanium chloride], μ-oxobis[dimethylsilylene (tetramethylcyclopentadienyl)(2-phenoxy)titanium chloride], and μ-oxobis[dimethylsilylene(tetramethylcyclopentadienyl)(3-tert-butyl-5-methyl-2-phenoxy)titanium chloride]. Further, compounds formed by replacing the chloride of the above-described μ-oxo compounds with fluoride, bromide, iodide, methyl, ethyl, isopropyl, phenyl, benzyl, methoxide, ethoxide, n-propoxide, isopropoxide, n-butoxide, isobutoxide, tert-butoxide, phenoxide or 2,6-di-tert-butylphenoxide.

Besides, the transition metal compound represented by the formula [3] and its μ-oxo type transition metal compound, whose examples are as mentioned above, examples of a compound used as the transition metal compound (B) are as follows. Examples of a compound having a nickel atom as the transition metal atom are nickel chloride, nickel bromide, nickel iodide, nickel sulfate, nickel nitrate, nickel perchlorate, nickel acetate, nickel trifluoroacetate, nickel cyanide, nickel oxalate, acetylacetonatonickel, bis(allyl) nickel, bis(1,5-cyclooctadiene)nickel, dichloro(1,5-cyclooctadiene)nickel, dichlorobis(acetnitrile)nickel, dichlorobis(benzonitrile)nickel, carbonyltris(triphenylphosphine)nickel, dichlorobis(triethylphosphine)nickel, diacetobis(triphenylphosphine)nickel, tetraxis(triphenylphosphine)nickel, dichloro[1,2-bis(diphenylphosphino)ethane]nickel, bis[1,2-bis(diphenylphosphino)ethane]nickel, dichloro[1,3-bis(diphenylphosphino)propane]nickel, bis[1,3-bis(diphenylphosphino)propane]nickel, tetraaminenickel nitrate, tetrakis(acetonitrile)nickel tetrafluoroborate and nickelphthalocianine.

Similarly, examples of a compound having a vanadium atom as the transition metal atom are vanadium acetylacetonate, vanadium tetrachloride and vanadium oxytrichloride.

Example of a compound having a samarium atom as the transition metal atom is bis(pentamethylcyclopentadienyl)samarium methyltetrahydrofuran.

Example of a compound having an ytterbium atom as the transition metal atom is bis(pentamethylcyclopentadienyl)ytterbium methyltetrahydrofuran.

These transition metal compound may be used alone or in combination of two or more kinds.

Among those transition metal compounds exemplified above, those represented by the formula [3] are preferred as the transition metal compound (B) used in the present invention. In particular, the transition metal compounds having the 4 group atom as M in the above formula [3] are preferred, and those having at least one cyclopentadiene type anion skeleton-carrying group as $L^2$ in the formula [3] are particularly preferred.

(C) Organoaluminum Compound

As the organoaluminum compound of the component (C) used for the catalyst for addition polymerization in accordance with the present invention, a known organoaluminum compound can be used. Preferred is an organoaluminum compound represented by the following formula [6].

 [6]

(In the formula, $R^8$ is a hydrocarbon group and all of $R^8$ may be the same or different from one another, Y is a hydrogen atom, a halogen atom, an alkoxy group, a aralkyloxy group, or an aryloxy group, all of Y may be the same or different from one another, and c is a number satisfying $0<c\leq 3$.)

In the formula [6] representing the organoaluminum compound, as $R^8$, preferred is a hydrocarbon group having 1 to 24 carbon atoms, and more preferred is an alkyl group having 1 to 24 carbon atoms. Specific examples thereof are a methyl group, an ethyl group, a n-propyl group, a n-butyl group, an isobutyl group, a n-hexyl group, a 2-methylhexyl group and a n-octyl group. Preferred are an ethyl group, a n-butyl group, an isobutyl group, a n-hexyl group or an n-octyl group.

When Y is a halogen atom, specific examples thereof are a fluorine atom, a chlorine atom, a bromine atom and an iodine atom, and preferred is a chlorine atom.

When Y is an alkoxy group, preferred is an alkoxy group having 1 to 24 carbon atoms. Specific examples thereof are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicoxy group, and preferred are a methoxy group, an ethoxy group and a tert-butoxy group.

When Y is an aryloxy group, preferred is an aryloxy having 6 to 24 carbon atoms. Specific examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group and an anthracenoxy group.

When Y is an aralkyloxy group, preferred is an aralkyloxy having 7 to 24 carbon atoms. Specific examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthracenylmethoxy group. Preferred is a benzyloxy group.

Specific examples of the organoaluminum compound represented by the formula [6] are trialkylaluminums such as trimethylaluminum, triethylaluminum, tri-n-propylaluminum, tri-n-butylaluminum, triisobutylaluminum, tri-n-hexylaluminum and tri-n-octylaluminum; dialkylaluminum chlorides such as dimethylaluminum chloride, diethylaluminum chloride, di-n-propylaluminum chloride, di-n-butylaluminum chloride, diisobutylaluminum chloride and di-n-hexylaluminum chloride; alkylaluminum dichlorides such as methylaluminum dichloride, ethylaluminum dichloride, n-propylaluminum dichloride, n-butylaluminum dichloride, isobutylaluminum dichloride and n-hexylaluminum dichloride; dialkylaluminum hydrides such as dimethylaluminum hydride, diethylaluminum hydride, di-n-propylaluminum hydride, di-n-butylaluminum hydride, diisobutylaluminum hydride and di-n-hexylaluminum hydride; trialkoxyaluminums such as trimethoxyaluminum, triethoxyaluminum and tri(tert-butoxy)aluminum; alkyldialkoxyaluminums such as methy(dimethoxy)aluminum, methyl(diethoxy)aluminum and methyl(di-tert-butoxy)aluminum; dialkylalkoxyaluminums such as dimethy(methoxy)aluminum, dimethyl (ethoxy)aluminum and dimethyl(tert-butoxy)aluminum; triaryloxyaluminums such as triphenoxyaluminum, tris(2,6-diisopropylphenoxy)aluminum and tris(2,6-diphenylphenoxy)aluminum; alkyldiaryloxyaluminums such as methyl(diphenoxy)aluminum, methylbis(2,6-diisopropylphenoxy)aluminum and methylbis(2,6-diphenylphenoxy)aluminum; and dialkylaryloxyaluminums such as dimethyl(phenoxy)aluminum, dimethyl (2,6-diisopropylphenoxy)aluminum and dimethyl (2,6-diphenylphenoxy)aluminum.

Among these, preferred are trialkylaluminums, more preferred are trimethylaluminum, triethylaluminum, tri-n-butylaluminum, triisobutylaluminum, tri-n-hexylaluminum and tri-n-octylaluminum, and particularly preferred are triisobutylaluminum and tri-n-octylaluminum.

These organoaluminum compounds may be used singly or in combination of two or more.

The component (B) is used in an amount of usually from $1 \times 10^{-6}$ to $1 \times 10^{-3}$ mol, and preferably from $5 \times 10^{-6}$ to $5 \times 10^{-4}$ mol per g of the component (A). The component (C) is used in an amount of preferably from 0.01 to 10,000, more preferably from 0.1 to 5,000, and the most preferably from 1 to 2,000 in terms of a molar ratio ((C)/(B)), namely in terms of the aluminum atom in the organoaluminum compound of the compound (c) to the transition metal atom in the transition metal compound of the component (B).

As the catalyst for addition polymerization in accordance with the present invention, a reaction product obtained in advance by contacting the component (A) and the component (B) and optionally the component (C) with one another may be used, or these components may be used in a manner of separately feeding in a polymerization reaction apparatus. When the components (A), (B) and (C) are used, optional two components selected therefrom may be contacted in advance with each other, followed by contact of the remaining one component.

A method for supplying respective catalyst components to the reactor is also not particularly limited. There can be applied a method comprising supplying respective components in each solid state, or in a solution, suspension or slurry state obtained using a hydrocarbon solvent, provided that any ingredient capable of de-activating the catalyst components such as water and oxygen has been sufficiently eliminated from the hydrocarbon solvent. As a solvent used, there are listed aliphatic hydrocarbon solvents such as butane, pentane, hexane, heptane and octane, aromatic hydrocarbon solvents such as benzene and toluene, and a halogenated hydrocarbon solvents such as methylene chloride, and aliphatic hydrocarbon solvents and aromatic hydrocarbon solvents are preferred.

When the catalyst components are supplied in their solution, suspension or slurry state, a concentration of the component (A) is usually from 0.01 to 1000 g/l, and preferably from 0.1 to 500 g/l. A concentration of the component (C) is usually from 0.0001 to 100 mol/l, and preferably from 0.01 to 10 mol/l in terms of Al atom. A concentration of the component (B) is usually from 0.0001 to 1000 mmol/l, and preferably from 0.01 to 50 mmol/l in terms of the transition metal atom.

The polymerization process is not particularly limited, and it is permitted to apply a gas phase polymerization carried out in a gaseous monomer or a solution polymerization or slurry polymerization using a solvent. A solvent used for the solution polymerization or the slurry polymerization includes an aliphatic hydrocarbon solvent such as butane, hexane, pentane, heptane and octane; an aromatic hydrocarbon solvent such as benzene and toluene; and a halogenated hydrocarbon solvent such as methylene chloride. Alternatively, it is possible to use an olefin itself as a solvent (bulk polymerization). As the polymerization process, any of a batch polymerization and a continuous polymerization can be applied. It is permitted to carry out the polymerization dividing into two or more steps different from one another in their reaction conditions. A polymerization time can be appropriately determined according to a kind of the desired olefin polymer and a reaction apparatus, and it is permitted to adopt a period of time of from 1 minute to 20 hours.

The present invention can be particularly suitably applied to a polymerization accompanied by the formation of addition polymer particles (for example, a slurry polymerization, a gas phase polymerization and a bulk polymerization).

The slurry polymerization may be carried out in a conventional slurry polymerization manner and condition, but it is not limited thereto. According to a preferred slurry polymerization, a monomer (and a comonomer), a material to be supplied, a diluent and the like are, if desired continuously added, and a continuous type reactor is used, so that a produced polymer is continuously or at least periodically taken out. Further, there can be applied a means using a loop reactor or a means using a stirring reactor. In addition, more than one stirring reactor, which may be different in a reactor or in a reaction condition, may be combined in series, in parallel or in series and parallel.

As the diluent, there can be used an inert diluent (medium) such as paraffin, cycloparaffin and aromatic hydrocarbons. A temperature of the polymerization reactor or a reaction zone is usually from about 0 to about 150° C., and preferably from 30 to 100° C. A pressure can be varied within a range of from about 0.1 to about 10 MPa, and preferably from 0.5 to 5 MPa. It is permitted to apply a pressure, under which a monomer and a comonomer are contacted with each other while maintaining the catalyst in a suspended state, and the medium and at least a part of the monomer and comonomer in a solution phase. Accordingly, the medium, temperature and pressure may be selected so as to produce the addition polymer in a solid particle form and recover it in that form.

A molecular weight of the addition polymer can be controlled by known manners, for example, by controlling a temperature of a reaction zone or introducing hydrogen.

The catalyst components and a monomer (and a comonomer) can be fed into a reactor or a reaction zone in an arbitrary order according to a conventional manner. For example, the catalyst components and a monomer (and a comonomer) are fed into a reaction zone at the same time or one after the other. If desired, the catalyst components and a monomer (and a comonomer) can be subjected to pre-contact in an inert atmosphere before their contact.

The gas phase polymerization may be carried out in a conventional gas phase polymerization manner and condition, but it is not limited thereto. As a gas phase polymerization apparatus, a fluidized bed reactor, preferably a fluidized bed reactor having an expansion can be used. A reaction apparatus equipped with a stirring blade in its reaction zone may also be used without any problem.

Respective components can be fed into a polymerization zone in a water-free state using an inert gas such as nitrogen or argon, or hydrogen or ethylene, or in feeding, respective components can be dissolved or diluted in a solvent to form a solution or a slurry. The catalyst components may be fed independently, or in feeding, arbitrarily selected catalyst components may be contacted in advance with one another in an arbitrary order.

With respect to polymerization conditions, a temperature is lower than that at which the polymer is melted, preferably from 0 to 150° C., and particularly preferably from 30 to 100° C. Furthermore, for the purpose of controlling the melt flow of a final product, it is permitted to add hydrogen as a molecular weight regulator. In addition, it is permitted that an inert gas coexists in the mixed gas during polymerization.

In the present invention, a pre-polymerization as mentioned below may be carried out before carrying out the above-mentioned polymerization (real polymerization).

The pre-polymerization can be carried out by feeding a small amount of an olefin in the presence of the modified particle (A) and the transition metal compound (B), or further in the presence of the organoaluminum compound (A). It is recommendable to carry out in a slurry state. Examples of a solvent used for formation of the slurry are inert hydrocarbons such as propane, butane, isobutane, pentane, isopentane, hexane, heptane, octane, cyclohexane, benzene and toluene. Further, in forming the slurry, it is permitted to use a liquefied olefin in place of a part or the whole of the inert hydrocarbon.

In the pre-polymerization, an amount of the organoaluminum compound (C) can be determined within a wide range of from 0.5 to 700 mol per mol of the transition metal compound (B). Preferable is from 0.8 to 500 mol per mol thereof, and particularly preferable is from 1 to 200 mol per mol thereof.

An amount of the olefin to be subjected to the pre-polymerization is usually from 0.01 to 1000 g per g of the modified particle, preferably from 0.05 to 500 g per g thereof, and particularly preferably from 0.1 to 200 g per g thereof.

In the pre-polymerization, a slurry concentration is preferably from 0.1 to 50 g-above-mentioned modified particle/l-solvent, and particularly preferably from 0.5 to 20 g-the above-mentioned modified particle/l-solvent. A pre-polymerization temperature is preferably from −20 to 100° C., and particularly preferably from 0 to 80° C. A partial pressure of the olefin in the gas phase during the pre-polymerization is preferably from 0.001 to 2 MPa, and particularly preferably from 0.01 to 1 MPa, excepting an olefin which is liquid under the pressure and temperature conditions of pre-polymerization. Further, a pre-polymerization time is not particularly limited, and usually from 2 minutes to 15 hours.

In carrying out the pre-polymerization, as a process for supplying the modified particle (A), transition metal compound (B), organoaluminum compound (C) and olefin, there can be applied any process of a process comprising contacting the modified particle (A), the transition metal compound (B) and optionally the organoaluminum compound (C), and thereafter supplying the olefin; a process comprising contacting the modified particle (A), the transition metal compound (B) and the olefin, and thereafter supplying the organoaluminum compound (C); a process comprising contacting the organoaluminum compound (C) and the transition metal compound (B) in the presence of the olefin, and thereafter supplying the modified particle (A), and the like. Further, as a supply method of the olefin, any of a method comprising supplying the olefin in order while keeping the pre-determined pressure of the polymerization zone, and a method comprising supplying all the pre-determined amount of the olefin in the first place can be applied. It is also permitted to add a chain transfer agent such as hydrogen to regulate a molecular weight of the polymer obtained.

In the present invention, that obtained by the pre-polymerization as mentioned above can be used as a catalyst component or a catalyst. The pre-polymerized catalyst component in accordance with the present invention includes a pre-polymerized catalyst component for addition polymerization obtained by pre-polymerizing an olefin in the presence of the catalyst for addition polymerization obtained by contacting the above-mentioned modified particle (A) and the transition metal compound of the Groups 3 to 11 or lanthanoide series with each other, and a pre-polymerized catalyst component for addition polymerization obtained by pre-polymerizing an olefin in the presence of the catalyst for addition polymerization obtained by contacting the above-mentioned modified particle (A), the transition metal compound of the Groups 3 to 11 or lanthanoide series and the organoaluminum compound (C) with one another. The pre-polymerized catalyst in accordance with the present invention includes a catalyst for addition polymerization obtained by pre-polymerizing an olefin in the presence of the catalyst for addition polymerization obtained by contacting the above-mentioned modified particle (A) and the transition metal compound of the Groups 3 to 11 or lanthanoide series with each other, and a catalyst for addition polymerization obtained by pre-polymerizing an olefin in the presence of the catalyst for addition polymerization obtained by contacting the above-mentioned modified particle (A), the transition metal compound of the Groups 3 to 11 or lanthanoide series and the organoaluminum compound (C) with one another. The catalyst obtained using said pre-polymerized catalyst component for addition polymerization in accordance with the present invention includes a catalyst for addition polymerization obtained by contacting said pre-polymerized catalyst component for addition polymerization and the organoaluminum compound (C) with each other.

The production process of an addition polymer of the present invention is a process for producing an addition polymer, in which an addition polymerizable monomer is polymerized in the presence of the above-described catalyst for addition polymerization of the present invention. Examples of the monomer used in the polymerization are olefins having 2 to 20 carbon atoms, diolefins, cyclic olefins, alkenyl aromatic hydrocarbons and polar monomers. Two or more kinds of the monomer may be used at the same time. It is permitted to use two or more monomers at the same time.

Specific examples thereof are olefins such as ethylene, propylene, 1-butene, 1-pentene, 4-methyl-1-pentene, 5-methyl-1-hexene, 1-hexene, 1-heptene, 1-octene, 1-nonene and 1-decene; diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadinene, 1,3-octadiene, 1,3-cyclooctadiene and 1,3-cyclohexadiene; cyclic olefins such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclododecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene and 8-cyanotetracyclododecene; alkenylbenzenes such as styrene, 2-phenylpropylene, 2-phenylbutene and 3-phenylpropylene; alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, 1,1-diphenylethylene. p-tert-butylstyrene and p-sec-butylstyrene; alkenyl aromatic hydrocarbons such as bisalkenylbenzenes including divinylbenzene and alkenylnaphthalenes including 1-vinylnaphthalene; and polar monomers such as α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic acid and their salts of metals such as sodium, potassium, lithium, zinc, magnesium and calcium, α,β-unsaturated carboxylic acid esters such as methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate, unsaturated dicarboxylic acids such as maleic acid and itaconic acid, vinyl esters such as vinyl acetate, vinyl propionate, vinyl caproate, vinyl caprate, vinyl laurate, vinyl stearate and vinyl trifluoroacetate, and unsaturated carboxylic acid glycidyl esters such as glycidyl acrylate, glycidyl methacrylate and monoglycidyl itaconate.

The present invention can be applied to homopolymerization or copolymerization of these monomers. Examples of copolymer-constituting monomers are ethylene-propylene, ethylene-1-butene, ethylene-1-hexene, ethylene-1-octene, ethylene-vinylcyclohexane and propylene-1-butene, ethylene-propylene-1-butene, ethylene-propylene-1-hexene and the like, but the present invention should not be limited thereto.

The catalyst for addition polymerization of the present invention is particularly suitable for a catalyst for polymerizing an olefin, and it is preferably used for a process for producing an olefin polymer. Particularly preferable example of the olefin polymer is an ethylene-α-olefin copolymer obtained by polymerizing a mixture of ethylene and the α-olefin. Among them, preferable is an ethylene-α-olefin copolymer having a polyethylene crystal structure. Herein, preferable is an α-olefin having 3 to 8 carbon atoms such as 1-butene, 1-hexene and 1-octene.

EXAMPLE

The present invention is illustrated in more detail with reference to Examples and Comparative Examples, but the present invention is not limited thereto. Measurement values of respective items in Examples were obtained by the following methods.

(1) Content of α-Olefin Unit in Copolymer

The content of a repeating unit derived from the α-olefin in the polymer obtained was determined from IR absorption spectrum, and was expressed in terms of a short chain branch number (SCB) per 1000 carbon atoms. In addition, the measurement and calculation were carried out using characteristic absorption derived from the α-olefin accrording to a method described in "Die Macromoleculare Chemie, 177, 449 (1976) McRae, M. A., Madams, W. F.". The IR spectrum was measured using an IR spectrophotometer (FT-IR 7300, manufactured by Japan Spectroscopic Co., Ltd.).

(2) Intrinsic Viscosity [η]: It was measured in a tetralin solution at 135° C. using Ubbelohde viscometer. (Unit: dl/g)

(3) Measurement of $^{13}$C-NMR

In the measurement of $^{13}$C-NMR, JNM-EX270 (67.5 MHz, $^{13}$C) (manufactured by JOEL) was used. The measurement was carried out at room temperature using a deuterated solvent described in Examples.

(4) Molecular Weight and Molecular Weight Distribution:

It was measured under the conditions described below according to gel permeation chromatography (GPC). A calibration curve was prepared using a standard polystyrene. The molecular weight distribution was represented by a ratio (Mw/Mn) of a weight average molecular weight (Mw) to a number average molecular weight (Mn).

Measurement machine: 150° C. type, manufactured by Milipore Waters Co.

Column: TSK-GEL GMH-HT (7.5×600): 2 columns
Measurement temperature: 140° C.
Solvent: ortho-dichlorobenzene
Measurement concentration: 5 mg/5 ml (5) Melt Flow Rate (MFR)

It was measured under a load of 21.18N at a temperature of 190° C. according to JIS K7210-1995. (Unit: g/10 minutes)

(6) Melt Flow Rate Ratio (MFRR)

Melt flow rates under a load of 21.18N at a temperature of 190° C. and under a load of 211.82N at a temperature of 190° C. according to JIS K7210-1995 were measured as MFR and MFR2, respectively, and a value (MFR2/MFR) in which MFR2 was divided by MFR, was defined as melt flow rate ratio (MFRR).

(7) Swelling Ratio (SR)

A strand was extruded under load of 21.18N at a temperature of 190° C. using a melt flow measurement apparatus specified in JIS K7210-1995. The diameter (d(mm)) of the strand measured was divided by a diameter ($d_0$ (mm) =2.095) of an orifice of the apparatus, and the value (d/d0) was defined as swelling ratio (SR).

(8) Melting Point (mp)

It was measured using a differential scanning colorie meter (manufactured by Seiko Instrument Inc., SSC-5200) under the following conditions:

Conditioning:

The temperature was raised from 40 to 150° C. at a rate of 10° C./min., kept at 150° C. for 5 minutes, lowered from 150 to 40 at a rate of 5° C./min. and then kept at at 40° C. for 10 minutes.

Measurement of mp:

After the conditioning, the temperature was immediately raised from 40 to 160° C. at a rate of 5° C./min.

Example 1

(1) Synthesis of Intermediate

In a 300 ml four necked flask purged with argon, 9.88 g (22.4 mmol) of triphenylbismuth and 100 ml of toluene were introduced and stirred at room temperature. To the mixture was dropped a solution of 12.6 g (68.5 mmol) of pentafluorophenol dissolve with 100 ml of toluene. After completion of dropping, the mixture was stirred at room temperature for 15.5 hours. Thereafter, the reaction was carried out for 4 hours under reflux of toluene, for 18 hours at room temperature, for 7 hours under of toluene, and then for 17 hours at room temperature in this order. A yellow needle-like crystal was separated by filteration, and dried under reduced pressure at room temperature to obtain 12.6 g of a intermediate.

(2) Synthesis of Component (A)

In a 50 ml four necked flask purged with argon, 1.54 g of the intermediate obtained in the Example 1(1) and 40 ml of toluene were charged and stirred at room temperature. To this, 0.73 g of silica (Sylopol 948, manufactured by Davison Co., Ltd.; A median particle diameter=55 μm; pore volume=1.66 ml/g; specific surface area=309 m$^2$/g) which had been heat-treated at 300° C. under a nitrogen stream, was added, the mixture was heated to 80° C. and stirred for 2 hours. After collecting a solid by filtration, the solid was washed four times with each 20 ml of toluene, then once with 20 ml of hexane, and then dried under reduced pressure at room temperature thereby obtaining a component (A). Elementary analysis revealed Bi=0.48 mmol/g, and F=4.0 mmol/g.

(3) Polymerization

A 3 l-inner volume autoclave equipped with a stirrer, which had been dried under reduced pressure and thereafter purged with argon, was made vacuum, 0.49 Vol % of hydrogen, 700 g of butane as a solvent and 50 g of 1-butene as a comonomer were fed therein, and then a temperature of the autoclave was raised to 70° C. Thereafter, ethylene was fed therein to obtain a partial pressure of 1.6 MPa, and the system was stabilized. To the resultant was added 0.9 mmol of triisobutylaluminum, successively, 0.5 μmol of ethylenebis(indenyl)zirconium dichloride, and then 17.2 mg of the component (A) obtained in the above (2) were added thereto to initiate polymerization. Polymerization was carried out for 60 minutes. As a polymerization result, 35 g of an ethylene/1-butene copolymer was obtained. As polymerization results, polymerization activity was 2000 g/g-carrier/h, SCB was 15.15, MFR was 0.93 g/10 min., MFRR was 91.40, and SR was 1.25.

Example 2

(1) Polymerization

In a 0.4 l-inner volume autoclave equipped with a stirrer, which had been dried under reduced pressure and thereafter purged with argon, 10 ml of 1-hexene as a comonomer and 190 ml of hexane as a solvent were charged, the reactor was heated to 70° C. After heating, ethylene was fed therein while keeping a partial pressure of 0.6 MPa. After the system was stabilized, to the resultant was added 0.25 mmol of triisobutylaluminum, successively, 1 μmol of ethylenebis (indenyl)zirconium dichloride, and then 30.4 mg of the component (A) obtained in Example 1 (2) were added thereto to initiate polymerization. Polymerization was carried out for 30 minutes. As a polymerization result, 22.4 g of an ethylene/1-hexene copolymer was obtained. Polymerization activity was 1500 g/g-carrier/h and 45 kg/mmol-Zr/h. Mw=58,000, Mw/Mn=1.9, SCB=36.0.

Example 3

(1) Synthesis of Intermediate

In a 2000 ml four necked flask purged with argon, 101 g (230 mmol) of triphenylbismuth and 500 ml of toluene were introduced and stirred at room temperature. To the mixture was dropped 345 ml of a toluene solution (concentration of pentafluorophenol: 2 mmol/ml, amount of pentafluorophenol:690 mmol) of pentafluorophenol. After completion of dropping, the reaction was carried out for 11 hours under reflux of toluene. A yellow needle-like crystal was separated by filtration, and dried under reduced pressure at room temperature to obtain 171 g of a intermediate. From an elementary analysis, Bi and F contents were 1.2 mmol/g and 15 mmol/g, respectively.

(2) Synthesis of Component (A)

In a 1000 ml four necked flask purged with argon, 17.7 g (23.4 mmol) of the intermediate obtained in the Example 3(1) and 300 ml of toluene were charged and stirred at room temperature. To this, 21.1 g of silica (Sylopol 948, manufactured by Davison Co., Ltd.; A median particle diameter=55 μm; pore volume=1.7 ml/g; specific surface area=306 m$^2$/g) which had been heat-treated at 300° C. under a nitrogen stream, and 30 ml of toluene were added, the mixture was heated to 80° C. and stirred for 2 hours. After collecting a solid by filtration, the solid was washed four times with each 100 ml of toluene, then once with 100 ml of hexane, and then dried under reduced pressure at room temperature to obtain 27.5 g of a component (A). Elementary analysis revealed Bi=0.48 mmol/g, and F=3.3 mmol/g.

(3) Polymerization

To a 0.4 l-inner volume autoclave equipped with a stirrer, which had been dried under reduced pressure and thereafter purged with argon, 10 ml of 1-hexene as a comonomer and 190 ml of hexane as a solvent were charged, and then the autoclave was heated to 70° C. After the heating, ethylene was fed therein to obtain a partial pressure of 0.6 MPa, and after the system was stabilized, 0.25 mmol of triisobutylaluminum was charged therein, successively, 0.3 μmol of ethylenebis(indenyl)zirconium dichloride, further 9.1 mg of the component (A) obtained in the above (2) were added thereto to initiate polymerization. Polymerization was carried out for 30 minutes. As polymerization results, 16.1 g of an ethylene/1-hexene copolymer was obtained. A polymerization activity was 3500 g/g-carrier/h and 110 kg/mmol-Zr/h. Mw=160,000, Mw/Mn=3.8, η=1.65, and SCB was 18.81.

Comparative Example 1

(1)

Synthesis was carried out according to Example 1(2) except that 1.16 g of triphenyl bismuth was used in stead of 1.54 g of the intermediate obtained in Example 1(1), and the amount of silica was changed to 1.10 g. As a result, 0.79 g of a white solid was obtained.

(2) Polymerization

In a 0.4 l-inner volume autoclave equipped with a stirrer, which had been dried under reduced pressure and thereafter purged with argon, 10 ml of 1-hexene as a comonomer and 190 ml of hexane as a solvent were charged, the reactor was heated to 70° C. After heating, ethylene was fed therein while keeping a partial pressure of 0.6 MPa. After the system was stabilized, to the resultant was added 0.25 mmol of triisobutylaluminum, successively, 1 μmol of ethylenebis (indenyl)zirconium dichloride, and then 22.9 mg of the white solid obtained in Comparative Example 1(1) were added thereto to initiate polymerization. Polymerization was carried out for 30 minutes. As a polymerization result, a trace amount of a polymer was obtained.

Example 4

(1) Synthesis of dimethylsilylene(η$^5$-tetramethylcyclopentadienyl)(3-tert-butyl-5-methyl-2-phenoxy) titanium dimethoxide In a Schlenk tube, 0.131 g (4.1 mmol) of methyl alcohol was dissolved in 10 ml of anhydrous diethyl ether and a diethyl ether solution (3.9 ml, 4.1 mmol) of methyllithium having a concentration of 1.05 mol/L was added dropwise at −78° C. thereto. The resulting mixture was heated to 20° C., the formation of lithium methoxide was confirmed by gas generation, and the resulting reaction solution was again cooled to −78° C. Into the reaction solution, 20 ml of an anhydrous diethyl ether suspension liquid of 0.919 g (2.0 mmol) of dimethylsilylene($\eta^5$-tetramethylcyclopentadienyl)(3-tert-butyl-5-methyl-2-phenoxy)titanium dichloride which was previously prepared in another Schlenk tube was transferred, and then, the resulting reaction mixture was gradually heated to room temperature to obtain a reaction solution. After concentrating the reaction solution, 20 ml of toluene was added and an insoluble product was separated by filtration. The filtrate was concentrated to obtain dimethylsilylene($\eta^5$-tetramethylcyclopentadienyl)(3-tert-butyl-5-methyl-2-phenoxy)titanium dimethoxide represented by the structural formula described below of yellow crystals (0.86 g, 95%)(hereinafter, referred to as "Compound A").

$^1$H-NMR (270 MHz, $C_6D_6$); δ 7.26 (m, 2H), 4.13 (s, 6H), 2.33 (s, 3H), 1.97 (s, 6H), 1.89 (s, 6H), 1.59(s, 9H), 0.55 (s, 6H)

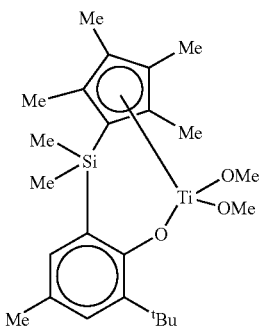

(2) Polymerization

To a 0.4 l-inner volume autoclave equipped with a stirrer, which had been dried under reduced pressure and thereafter purged with argon, 2 ml of 1-hexene as a comonomer and 198 ml of cyclohexane as a solvent were charged thereto, and the temperature of the reactor was raised to 70° C. After raising the temperature, ethylene was fed while adjusting its pressure at 0.6 Mpa. After the system was stabilized, 0.25 mmol of triisobutylaluminum was charged, successively 1 ml of a toluene solution in which a mixture of the compound A and triisobutylaluminum was dissolved (the concentration of the compound A is 1 μmol/ml, the concentration of triisobutylaluminum is 50 μmol/ml, and the molar ratio of Al to Ti was adjusted to 50) (namely, 1 μmol of the compound A and 50 μmol of triisobutylaluminum) were charged, and further 43.0 mg of the component A obtained in Example 1(2) was charged to initiate polymerization. Polymerization was carried out for 30 minutes. As a result of the polymerization, 1.79 g of an ethylene-1-hexene copolymer was obtained. A polymerization activity was 83 g/g-carrier/h, and 3.6 kg/mmol-Ti/h, Mw was 440,000, Mw/Mn was 2.1, [η] was 4.55 dl/g, and SCB was 19.34.

Example 5

(1) Synthesis of Intermediate

In a 500 ml four necked flask purged with argon, 17.2 g (39.1 mmol) of triphenylbismuth and 175 ml of toluene were introduced and stirred at room temperature. To the mixture was dropped 50 ml of a toluene solution in which 22.0 g (119 mmol) of pentafluorophenol was dissolved. After completion of dropping, the reaction was carried out for 8 hours under reflux of toluene, for 15 hours at room temperature and 4 hours under reflux of toluene. A yellow needle-like crystal was separated by filteration, and dried under reduced pressure at room temperature to obtain 28.2 g of an intermediate.

(2) Synthesis of Component (A)

In a 100 ml four necked flask purged with argon, 2.48 g of the intermediate obtained in the Example 5(1) and 40 ml of toluene were charged and stirred at room temperature. To this, 3.11 g of silica (Sylopol 948, manufactured by Davison Co., Ltd.; A median particle diameter=55 μm; pore volume=1.66 ml/g; specific surface area=309 m$^2$/g) which had been heat-treated at 300° C. under a nitrogen stream, and 5 ml of toluene were added, the mixture was heated to 80° C. and stirred for 2 hours. After collecting a solid by filtration, the solid was washed four times with each 30 ml of toluene, then once with 30 ml of hexane, and then dried under reduced pressure at room temperature to obtain 3.84 g of a component (A). Elementary analysis revealed Bi=0.53 mmol/g, and F=3.2 mmol/g.

(3) Polymerization

To a 0.4 l-inner volume autoclave equipped with a stirrer, which had been dried under reduced pressure and thereafter purged with argon, 15 ml of 1-hexene as a comonomer and 185 ml of cyclohexane as a solvent were charged, and then the autoclave was heated to 180° C. After the heating, ethylene was fed therein to obtain a partial pressure of 2.5 MPa, and after the system was stabilized, 0.3 mmol of triisobutylaluminum was charged, successively 1 ml of a toluene solution in which a mixture of the compound A and triisobutylaluminum was dissolved (the concentration of the compound A is 0.5 μmol/ml, the concentration of triisobutylaluminum is 25 μmol/ml, and the molar ratio of Al to Ti was adjusted to 50)(namely, 0.5 μmol of the compound A and 25 μmol of triisobutylaluminum) were charged, and further 126 mg of the component A obtained in Example 5(2) was charged to initiate polymerization. Polymerization was carried out for 2 minutes. As a result of the polymerization, 1.41 g of an ethylene-1-hexene copolymer was obtained. A polymerization activity was 340 g/g-carrier/h, and 85 kg/mmol-Ti/h, Mw was 100000, Mw/Mn was 1.9, [η] was 1.46 dl/g, and mp was 81.4° C.

As mentioned above in detail, according to the present invention, there are provided a modified particle which can form a catalyst for addition polymerization exhibiting a high polymerization activity by using as a co-catalyst component for activation (catalyst component); a catalyst component for addition polymerization composed of the modified particle; a catalyst for addition polymerization prepared by using the catalyst component; and a process for producing an addition polymer efficiently using the catalyst for addition polymerization.

The invention claimed is:

1. A process for producing a catalyst component for addition polymerization, which comprises the step of contacting (a) triphenyl bismuth, (b) pentafluorophenol and (c) silica.

2. A process for producing a catalyst for addition polymerization, which comprises the steps of:
   producing a catalyst component for addition polymerization by the process according to claim 1; and
   contacting the catalyst component for addition polymerization with a transition metal compound (B) of Groups 3 to 11 or lanthanide series.

3. The process for producing a catalyst for addition polymerization according to claim 2, wherein transition metal compound (B) of the Groups 3 to 11 or lanthanide series is a metallocene compound.

4. A process for producing a catalyst for addition polymerization, which comprises the steps of:
producing a catalyst component for addition polymerization by the process according to claim 1; and
contacting the catalyst component for addition polymerization with a transition metal compound (B) of Groups 3 to 11 or lanthanide series and an organoaluminum compound(C).

5. The process for producing a catalyst for addition polymerization according to claim 4, Wherein the transition metal compound (B) of the Groups 3 to 11 or lanthanide series is a metallocene compound.

6. A process for producing an addition polymer, which comprises the step of polymerizing an addition polymerizable monomer with a catalyst for addition polymerization produced by the process according to claim 2.

7. The process for producing an addition polymer according to claim 6, wherein the addition polymerizable monomer is an olefin.

8. The process for producing an addition polymer according to claim 6, wherein the addition polymerizable monomer is a mixture of ethylene with an α-olefin.

9. A process for producing an addition polymer, which comprises the step of polymerizing an addition polymerizabie monomer with a catalyst for addition polymerization produced by the process according to claim 4.

10. The process for producing an addition polymer according to claim 9, wherein the addition polymerizable monomer is an olefin.

11. The process for producing an addition polymer according to claim 9, wherein the addition polymerizabie monomer is a mixture of ethylene with an αolefin.

* * * * *